US007058731B2

(12) United States Patent
Kodama

(10) Patent No.: US 7,058,731 B2
(45) Date of Patent: Jun. 6, 2006

(54) FAILOVER AND DATA MIGRATION USING DATA REPLICATION

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/911,107

(22) Filed: Aug. 3, 2004

(65) Prior Publication Data
US 2006/0031594 A1    Feb. 9, 2006

(51) Int. Cl.
*G06F 3/00* (2006.01)
(52) U.S. Cl. ................. 710/5; 710/1; 710/74; 711/112; 711/161; 711/200; 711/202; 711/203
(58) Field of Classification Search ............ 710/1, 710/5, 74; 711/112, 161, 200, 202, 203
See application file for complete search history.

(56) References Cited

U.S. PATENT DOCUMENTS

| 6,691,245 | B1 * | 2/2004 | DeKoning ............... 714/6 |
| 6,832,289 | B1 | 12/2004 | Johnson |
| 6,857,059 | B1 | 2/2005 | Karpoff et al. |
| 2002/0004890 | A1 * | 1/2002 | Ofek et al. ............... 711/161 |
| 2003/0130833 | A1 * | 7/2003 | Brownell et al. ......... 703/23 |
| 2004/0250021 | A1 | 12/2004 | Honda et al. |
| 2004/0260861 | A1 | 12/2004 | Serizawa et al. |

OTHER PUBLICATIONS

Hitachi Data Systems: "Data Replication"; http://www.hds.com/products_services/storage_mgmt_software/business_continuity/datareplication.html#dynamiclinkmanager; Copyright 2004.
Veritas Architect Network: "The leading Online Storage Management Software"; http://www.veritas.com/van/products/volumemanagerwin.html; Copyright 2003.
Powerpath Automate Path Management nondisruptively: "The Big Picture"; http://emc.com/products/software/powerpath.jsp; Copyright 2004.
Hitachi Data Systems, press release: "HDS Helps CSC Relocate San Diego County Data Center"; Oct. 2, 2000.
Veritas Data Sheet; "Advanced Storage Management Technology for the Windows 2000 Platform"; Version 3, Copyright 2002 Veritas.
Oracle RAC 10g Overview: "An Oracle White Paper"; Nov. 2003.
Hitachi Data Systems: "Hitachi TrueCopy™ Remote Replication Software"; Apr. 2004.
EMC SRDF Family: The Big Picture; http://emc.com/products/networking/srdf.jsp; Copyright 2004.
Veritas: "Hight Availability, Replication"; http://www.veritas.com/Products/www?c=subcategory&refId=151; Copyright 2004.

* cited by examiner

*Primary Examiner*—Kim Huynh
*Assistant Examiner*—Angel L. Casiano
(74) *Attorney, Agent, or Firm*—Townsend and Townsend and Crew LLP

(57) ABSTRACT

A virtual volume module in a host system provides virtual volume view to user-level and system-level applications executing on the host system. The virtual volume module maps I/O from the applications which are directed to a virtual volume to a first physical volume in a first storage system. When necessary, the virtual volume module can map application I/O's to a second volume in a second storage system. The second storage system replicates data in the first storage system, so that when re-mapping occurs it is transparent to the applications running on the host system.

28 Claims, 13 Drawing Sheets

| Pair Name | Volumes | Storage | Roles | HBAs | Availability | Pair |
|---|---|---|---|---|---|---|
| Pair 1 | Volume X-P | A | Primary | HBA1 | Yes | |
| | Volume X-S | B | Secondary | HBA2 | Yes | |
| Pair 2 | Volume Y-P | C | Primary | HBA3 | No | |
| | Volume Y-S | D | Secondary | HBA4 | Yes | |

Fig. 2

| Pair Name | Volumes | Storage | Roles | HBAs | Availability | Pair |
|---|---|---|---|---|---|---|
| Pair 1 | Volume X-P | A | Primary | HBA1 | No | Split |
| | Volume X-S | B | Secondary | HBA2 | Yes | Split |
| Pair 2 | Volume Y-P | C | Primary | HBA3 | No | |
| | Volume Y-S | D | Secondary | HBA4 | Yes | |

Fig. 2A

| Pair Name | Volumes | Storage | Roles | HBAs | Availability | Pair |
|---|---|---|---|---|---|---|
| Pair 1 | Volume X-P | A | Secondary | HBA1 | Yes | Split |
| | Volume X-S | B | Primary | HBA2 | No | Split |
| Pair 2 | Volume Y-P | C | Primary | HBA3 | No | |
| | Volume Y-S | D | Secondary | HBA4 | Yes | |

Fig. 2B

FAILOVER AND DATA MIGRATION USING DATA REPLICATION

BACKGROUND OF THE INVENTION

The present invention is related to data storage systems and in particular to failover processing and data migration.

A multitude of storage system configurations exist to provide solutions to the various storage requirements of modern businesses.

A traditional multipath system shown in FIG. 7 shows the use of multipath software to increase accessibility to a storage system. A host 0701 provides the hardware and underlying system software to support user applications 070101. Data communication paths 070301, 070303 provide an input-output (I/O) path to a storage facility 0705 (storage system). Multipath software 070105 is provided to increase accessibility to the storage system 0705. The software provides typical features including failover handling for failures on the I/O paths 070301, 070303 between the host 0701 and the storage system 0705.

In a multipath configuration, the host 0701 has two or more Fibre Channel (FC) host bus adapters 070107. The storage system 0705, likewise, includes multiple Fibre Channel interfaces 070501, where each interface is associated with a volume. In the example shown in FIG. 7, a single volume 070505 is shown. A disk controller (070503) handles I/O requests received from the host 0701 via the FC interfaces 070501. As noted above, the host has multiple physically independent paths 070301, 070403 to the volume(s) in the storage system 0705. Fibre Channel switches which are not shown in the figure can be used for connecting the host and the storage system. It can be appreciated of course that other suitable communication networks can be used; e.g., Ethernet and InfiniBand.

In a typical operation, user applications 070101 and system software (e.g., the OS file system, volume manager, etc.) issue I/O requests to the volume(s) 070505 in the storage system 0705 via SCSI (small computer system interface) 070103. The multipath software 070105 intercepts the requests and determines a path 070301, 070303 over which the request will be sent. The request is sent to the disk controller 070503 over the selected path.

Path selection depends on various criteria including, for example, whether or not all the paths are available. If multiple paths are available, the least loaded path can be selected. If one or more paths are unavailable, the multipath software selects one of the available paths. A path may be unavailable because of a failure of a physical cable that connects a host's HBA (host bus adapter) and a storage system's FC interface, a failure of an HBA, a failure of an FC interface, and so on. By providing the host with the host 0701 with multiple physically independent paths to volumes in the storage system 0705, multipath software can increase the availability of the storage system from I/O path's perspective.

Typical commercial systems include Hitachi Dynamic Link Manager™ by Hitachi Data Systems; VERITAS Volume Manager™ by VERITAS Software Corporation; and EMC PowerPath by EMC Corporation.

FIG. 8 shows a storage system configured for data migration. Consider the situation where a user on the host machine 1301 has been accessing and storing data in a storage system A 1305; e.g., Volume X-P 130505. Suppose the user now wants to use the volume designated as Volume X-S 130705 on storage system B 1307. The host machine 1301 therefore needs to subsequently access Volume X-S.

To switch the host machine 1301 over to storage system B 1307, the data stored in Volume X-P needs to be migrated to Volume X-S (the assumption is that Volume X-S does not have a copy of the data on Volume X-P). In addition, a communication channel from the host machine 1301 to storage system B 1307 must be provided. For example, physical cabling 130301 that connects the host machine 1301 to storage system A 1305 needs to be reconnected to storage system B 1307. The reconnected cable is shown in dashed lines 130303.

Data migration from storage system A 1305 to storage system B 1307 is accomplished by the following steps. It is noted here that some of all of the data in storage system A can be migrated to storage system B. The amount of data that is migrated will depend on the particular situation. First, the user must stop all I/O activity with the storage system A 1305. This might involve stopping the user's applications 130101, or otherwise indicating to (signaling) the applications to suspend I/O operations to storage system A. Depending on the host machine, the host machine itself may have to be shut down. Next, the physical cabling 130301 must be reconfigured to connect the host machine 1301 to storage system B 1307. For example, in a fibre channel (FC) installation, a physical cable is disconnected from the FC interface 130501 of storage system A and connected to the FC interface 130701 of storage system B. Next, the host machine 1301 must be reconfigured to use Volume X-S in storage system B instead of Volume X-P in storage system A.

On the storage system side, the data in Volume X-P must be migrated to Volume X-S. To do this, the disk controller 130703 of storage system B initiates a copy operation to copy data from Volume X-P to Volume X-S. The data migration is performed over the FC network 130505. Once the data migration is under way, the user applications 130101 can once again resume their I/O activity, now with storage system B, where the migration operation continues as a background process. Depending on the host machine, this may involve restarting (rebooting) the host machine.

If the host machine 1301 makes a read access of a data block on Volume X-S that has not yet been updated by the migration operation, the disk controller B 130703 accesses the data of the requested data block from storage system A. Typically, the migration takes place on a block-by-block basis in sequential order. However, a read operation will likely access a block that is out of sequence with respect to the sequence of migration of the data blocks. The disk controller B can use a bitmap (or some other suitable mechanism) to keep track of which blocks have been updated by the migration operation and by the write operations. The bitmap can also be used to prevent a newly written block location from being over-written with data from Storage System A during the data migration process.

Typical commercial systems include Hitachi On-Line Data Migration by Hitachi Data Systems and Peer-to-peer Remote Copy (PPRC) Dynamic Address Switching (DAS) by IBM, Inc.

FIG. 9 shows a conventional server clustering system. Clustering is a technique for increasing system availability. Thus, host systems 0901 and 0909 each can be configured respectively with suitable clustering software 090103 and 090903, to provide failover capability among the hosts.

In a server cluster configuration, there are two or more physically independent host systems. There are two or more physically independent storage systems. FIG. 9, for example, shows that Host 1 is connected to storage system A 0905 over an FC network 090301. Similarly, Host 2 is connected to storage system B 0907 over an FC network 090309. Storage system A and storage system B are in data communication with each other over yet another FC network 090305. Although it is not shown, it can be appreciated that the network passes through a wide area network (WAN), meaning that Host 2 and storage system B can be located at a remote data center that is far from Host 1 and storage system A.

Under normal operations, Host 1 accesses (read, write) Volume X-P in storage system A. The disk controller A 090503 replicates data that is written to Volume X-P by Host 1 to Volume X-S in storage system B. The replication is performed over the FC network 090305. The replication can occur synchronously, in which case the storage system A does not acknowledge a write request from the Host 1 until it is determined that the data associated with the write request has been replicated to storage system B. Alternatively, the replication can occur asynchronously, in which case storage system A acknowledges the write request from Host 1 independently of when the data associated with the write request is replicated to the storage system B.

When a failure in either Host 1 or in storage system A occurs, failover processing takes place so that Host 2 can take over the tasks of Host 1. Host 2 can detect a failure in Host 1 by using a heartbeat message, where Host 1 periodically transmits a message ("heartbeat") to the Host 2. A failure in Host 1 is indicated if Host 2 fails to receive the heartbeat message within a span of time. If the failure occurs in the storage system A, the Host 1 can detect such failure; e.g., by receiving a failure response from the storage system, by timing out waiting for a response, etc. The clustering software 090103 in the Host 1 can signal the Host 2 of the occurrence.

When the Host 2 detects the occurrence of a failure, it performs a split pair operation (in the case where remote copy technology is being used) between Volume X-P and Volume X-S. When the split pair operation is complete, the Host 2 can mount the Volume X-S and start the applications 090901 to resume operations in Host 2. The split pair operation causes the data replication between Volume X-P and Volume X-S to complete without interruption, Host 1 cannot update Volume X-P during a split pair operation. This ensures that the Volume X-S is a true copy of the Volume X-P when Host 2 takes over for Host 1. The foregoing is referred to as active-sleep failover. Host 2 is not active (sleep, standby mode) from a user application perspective until a failure is detected in Host 1 or in storage system A.

Typical commercial systems include VERITAS Volume Manager™ by VERITAS Software Corporation and Oracle Real Application Clusters (RAC) 10 g by Oracle Corp.

FIG. 10 shows a conventional remote data replication configuration (remote copy). This configuration is similar to the configuration shown in FIG. 9 except that the host 1101 in FIG. 10 is not clustered. Data written by applications 110101 to the Volume X-P is replicated by the disk controller A 110503 in the storage system A 1105. The data is replicated to Volume X-S in storage system B 1107 over an FC network 110305. Although it is not shown, the storage system B can be a remote system accessed over a WAN.

Typical commercial systems include Hitachi TrueCopy™ Remote Replication Software by Hitachi Data Systems and VERITAS Storage Replicator and VERITAS Volume Replicator, both by VERITAS Software Corporation.

SUMMARY OF THE INVENTION

A data access method and system includes a host system having a virtual volume module. The virtual volume module receive I/O operations originating from I/O requests made by applications executing on the host system. The I/O operations are directed to a virtual volume. The virtual volume module produces "corresponding I/O operations" that are directed to a target physical volume in a target storage system. The target storage system can be selected from among two or more storage systems. Date written to the target storage system is replicated to another of the storage systems. When a failure in a storage system that is designated as the target storage system, the virtual volume module designates another storage system as the target storage system for subsequent corresponding I/O operations.

BRIEF DESCRIPTION OF THE DRAWINGS

Aspects, advantages and novel features of the present invention will become apparent from the following description of the invention presented in conjunction with the accompanying drawings, wherein:

FIG. 2 illustrates in tabular format configuration information used by the virtual volume module;

FIGS. 2A and 2B illustrate particular states of the configuration information;

DESCRIPTION OF THE SPECIFIC EMBODIMENTS

Embodiment 1

Figure 1:
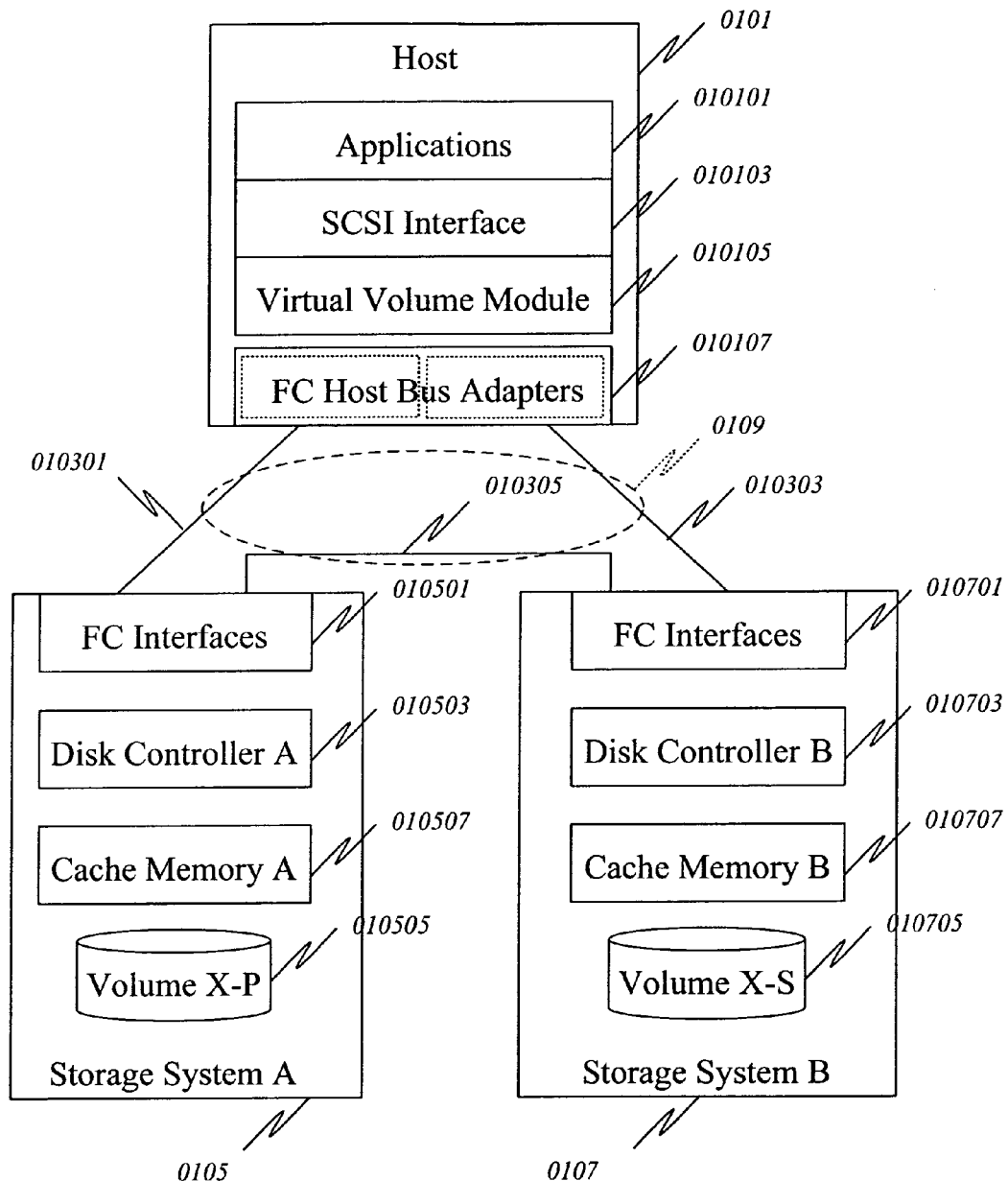
FIG. 1 is a block diagram showing a configuration of a computer system to which first and second embodiments of the present invention are applied.

FIG. 1 shows an illustrative embodiment of a first aspect of the present invention. This embodiment illustrates path failover between two storage systems, although the present invention can be extended to cover more that two storage systems. The embodiment described is a multiple storage system which employs remote copy technology to provide failover recovery.

Generally, a virtual volume module is provided in a host system. The host system is in data communication with a first storage system. Data written to the first storage system is duplicated, or otherwise replicated, to a second storage system. The virtual volume module interacts with the first and second storage systems to provide virtual storage access for applications running or executing on the host system. The virtual volume can detect a failure that can occur in either or both of the first and second storage systems and direct subsequent data I/O requests to the surviving storage system, if there is a surviving storage system. Following is description of an illustrative embodiment of this aspect of the present invention.

A system according to one such embodiment includes a host 0101 that is in data communication with storage systems 0105, 0107, via suitable communication network links. According to the embodiment shown in FIG. 1, a Fibre Channel (FC) network 010301 connects the host 0101 to a storage system 0105 (Storage System A). An FC network 010303 connects the host 0101 to a storage system 0107 (Storage System B). The storage systems 0105, 0107 are linked by an FC network 010305. It can be appreciated of course that other types of networks can be used instead of Fibre Channel; for example, InfiniBand and Ethernet. It can be further appreciated that Fibre Channel switches 0109 can be used to create a storage area network (SAN) among the storage systems. It will be understood that other storage architectures can also be used. It is further understood that the FC networks shown in FIG. 1 (and in the subsequent embodiments) can be individual networks, or part of the same network, or may comprise two or more different networks.

Though not shown, it can be appreciated that the host 0101 comprises standard hardware components typically found in a host computer system, including a data processing unit (e.g., CPU), memory (e.g., RAM, boot ROM, etc.), local hard disk storage, and so on. The host 0101 further comprises one or more FC host bus adapters (FBC HBAs) 010107 to connect to the storage systems 0105, 0107. The embodiment in FIG. 1 shows two FC HBAs illustrated in phantom, each having a connection to one of the storage systems 0105, 0107. The host 0101 further includes a virtual volume manager 010105, a small computer system interface (SCSI) 010103, and one or more applications 010101. The applications can be user-level software that runs on top of an operating system (OS), or is system-level software that are components of the OS. The applications access (read, write) the storage systems 0105, 0107 by making input/output (I/O) requests to the storage systems. Typical OSs include Unix, Linux, Windows 2000/XP/2003, MVS, and so on. User-level applications includes typical systems such as database systems, but of course can be any software that has occasion to access data on a storage system. Typical system-level applications include system services such as file systems and volume managers. Typically, there is data associated with an access request, whether it is data to be read from storage or data to be written to storage.

The SCSI interface 010103 is a typical interface to access volumes provided by the storage systems 0105, 0107. The virtual volume module 010105 presents "virtual volumes" to the host applications 010101. The virtual volume module interacts with the SCSI interface 010103 to map virtual volumes to physical volumes in storage systems 0105, 0107.

For system-level applications, the OS is configured with one or more virtual volumes. When the OS accesses the volume it directs one or more suitable SCSI commands to the virtual volume, by way of the virtual volume module 010105. The virtual volume module 010105 produce corresponding commands or operations that are targeted to one of the physical volumes (e.g., Volume X-P, Volume X-S) in the storage systems 0105, 0107. The corresponding command or operation may be a modification of the original SCSI command or operation if a parameter of the command includes a reference to the virtual volume (e.g., open). The modification would be to replace the reference to the virtual volume with a reference to a physical volume (the target physical volume). Subsequent commands need only be directed to the appropriate physical volume, including communicating over the appropriate communication interface (010107, FIG. 1).

For user-level applications, the application can make a file system call, which is translated by the OS to a series of SCSI accesses that are targeted to a virtual volume. The virtual volume module in turn makes corresponding SCSI accesses to one of the physical volumes. If the OS provides the capability, the user-level application can make direct calls to the SCSI interface to access a virtual volume. Again, the virtual volume module would modify the calls to access one of the physical volumes. Further detail about this aspect of the present invention will be discussed below.

Each storage system 0105, 0107 includes one or more FC interfaces 010501, 010701, one or more disk controllers 010503, 010703, one or more cache memories 010507, 010707, and one or more volumes 010505, 010705. The FC interface is physically connected to the host 0101 or to the other storage system, and receives I/O and other operations from the connected device. The received operation is forwarded to the disk controller which then interacts with the storage device to process the I/O request. The cache memory is a well known technique for improved read and write access.

Storage system 0105 provides a volume designated as Volume X-P 010505 for storing data. Storage system 0107, likewise, provides a volume designated as Volume X-S 010705 for storing data. A volume is a logical unit of storage that is composed of one or more physical disk drive units. The physical disk drive units that constitute the volume can be part of the storage system or can be external storage that is separate from the storage system.

Operation of the virtual volume module 010105 will now be discussed in further detail. First, the virtual volume module 010105 performs a discover operation. In the example shown in FIG. 1, assume that Volume X-P and Volume X-S will be discovered. A configuration file stored in the host 0101 will indicate to the virtual volume module 010105 that Volume X-S is the target of a replication operation that is performed on Volume X-P. Table I below is an illustrative example of the relevant contents of a configuration file:

TABLE I

| #Configuration File |
|---|
| MultiPathSet Name: Pair 1 |
| Primary Volume: Volume X-P in Storage System A<br>Secondary Volume: Volume X-S in Storage System B<br>Virtual Volume Name: VVolX |
| MultiPathSet Name: Pair 2 |
| Primary Volume: Volume Y-P in Storage System C<br>Secondary Volume: Volume Y-S in Storage System B<br>Virtual Volume Name: VVolY |

It is noted that instead of using a configuration file, a command line interface can be provided, allowing a user (e.g., system administrator) to interactively configure the virtual volume module 010105. For example, if the host 0101 is running on a UNIX OS, interprocess communication (IPC) or some other similar mechanism can be used to signal the virtual volume module with the information contained in the configuration table (TABLE I).

There is an entry for each pair of volumes that are configured as primary and secondary volumes (collectively referred to as a "remote copy pair") for data replication (remote copy) operations. For example, Volume X-P is referred to as a primary volume, meaning that it is the volume with which the host will perform I/O operations. The storage system 0105 containing Volume X-P can be referred to as the primary system. Volume X-S is referred to as the secondary volume; the storage system 0107 containing Volume X-S can be referred to as the secondary system. In accordance with conventional replication operations, data written to the primary volume is replicated to the secondary volume. In accordance with the present invention, the secondary volume also serves as a failover volume in case the primary volume goes off line for some reason, whether scheduled (e.g., for maintenance activity), or unexpectedly (e.g., failure). The example configuration file shown in Table I identifies two replication pairs; or, viewed from a failover point of view, two failover paths.

When a new pair of volumes is created in the configuration file, a virtual volume module issues a pair creation request to a primary storage system. Then the disk controller of the primary controller creates the requested pair, sets the pair status to SYNCING and sends a completion response to the virtual volume module. After the pair is created, the disk controller of the primary storage system starts to copy data in the primary volume to the secondary volume in the secondary storage system. This is called Initial Copy. Initial copy is an asynchronous and independent processing from I/O request processing by the disk controller. The disk controller knows which blocks in the primary volume have been copied to the secondary volume by using a bitmap table. When the primary volume and the secondary volume become identical, the disk controller changes the pair status to SYNCED. In both SYNCING and SYNCED states, when the disk controller receives a write request to the primary volume, the disk controller sends the write request to the disk controller of the secondary volume and waits for the response before the disk controller of the primary storage returns a response to the host. This is called synchronous remote data replication.

Though the virtual volume module 010105 and the storage systems 0105, 0107 use remote copy technology, it can be appreciated that embodiments of the present invention can be implemented with any suitable data replication or data backup technology or method. The virtual volume module can be readily configured to operate according to the data replication or data backup technology that is provided by the storage systems. Generally, the primary volume serves as the production volume for data I/O operations made by user-level and system-level applications running on the host. The secondary volume serves as a backup volume for the production volume. As will be explained, in various aspects of the present invention, the backup volume can become the production volume if failure of the production volume is detected. It will be understood therefore that the terms primary volume and secondary volume do not refer to the particular underlying data replication or data backup technology but rather to the function being served, namely, production volume and backup volume. It will be further understood that some of the operations performed by the virtual volume module are dictated by the remote copy methodology of the storage systems.

Continuing with FIG. 1, the virtual volume module 010105 provides virtual volume access to the applications 010101 executing on the host 0101 via the SCSI interface 010103. The OS, and in some cases user-level applications, "see" a virtual volume that is presented by the virtual volume module 010105. For example, Table I shows a virtual volume that is identified as VVolX. The applications (e.g., via the OS) send conventional SCSI commands (including but not limited to read and write operations) via the SCSI interface to access the virtual volume. The virtual volume module intercepts the SCSI commands and translates the commands to corresponding I/O operations that are suitable for accessing Volume X-P in the storage system 0105 or for accessing Volume X-S in the storage system 0107.

In this first embodiment of the present invention the selection between Volume X-P and Volume X-S as the target volume is made in accordance with the following situations (assuming an initial pairing wherein the Volume X-P is the primary volume and Volume X-S is the secondary volume):

a) If Volume X-P is a primary volume and is available, Virtual Volume Module services the I/O requests using Volume X-P via FC network (010301).

b) If Volume X-P is a primary volume but is not available and Volume X-S is available and the pair status is SYNCED, Virtual Volume Module services the I/O requests using Volume X-S via FC network (010303). Further detail about how the Virtual Volume Module achieves this is discussed below.

c) If Volume X-S is a primary volume and is available, Virtual Volume Module services the I/O requests using Volume X-S via FC network (010303). This situation can arise if the status of the remote copy pair is REVERSE-SYNCING or REVERSE-SYNCED, where data in the secondary volume (e.g., Volume X-S) has been copied to the primary volume (e.g., Volume X-P). The roles of primary volume and secondary volume are reversed in these states. Further detail about how the Virtual Volume Module achieves this is discussed below.

d) If Volume X-S is a primary volume and is not available and Volume X-P is available and the pair status is REVERSE-SYNCED, Virtual Volume Module services the I/O requests using Volume X-P via FC network (010301). Further detail about how the Virtual Volume Module achieves this is discussed below.

e) If both volumes are un-available, Virtual Volume Module tells the requesting applications that it cannot complete the requested I/O request because of failures in both the primary and the secondary volumes. Further detail about how the Virtual Volume Module achieves this is discussed below.

f) If Volume X-P is a primary volume and is not available and the pair status is SYNCING, or if Volume X-S is a primary volume and is not available and the pair status is REVERSE-SYNCING, then Virtual Volume Module tells the requesting applications that it cannot complete the I/Os because of failures. The SYNCING status or the REVERSE-SYNCING indicates that Volume X-P and Volume X-S are not identical. Because the secondary volume is not updated, the Virtual Volume Module cannot process I/O requests from the secondary volume. For example, an application wants to read data which has been written to the primary volume and the data has not yet been copied to the secondary volume, and the primary volume is not available. The Virtual Volume Module cannot find the requested data in the secondary volume.

The virtual volume module 010105 can learn of the availability status of the volumes (Volume X-P, Volume X-S) by issuing suitable I/O operations (or some other SCSI command) to the volumes. The availability of the volumes can be determined based on the response. For example, if a response to a request issued to a volume is not received within a predetermined period, then it can be concluded that the volume is not available. Of course, depending on the storage systems used in a particular implementation, explicit commands may be provided to obtain this information.

FIG. 2 shows in tabular form information that is managed and used by the virtual volume manager 010105. The information indicates the availability and pairing state of the volumes. A Pair Name field contains the name of the remote copy pair as shown in the configuration table (Table I); e.g., "Pair 1" and "Pair 2". A Volumes field contains the names of the volumes which constitute the identified pairs, also shown in the configuration table (Table I). A Storage field contains the names of the storage systems in which the volumes reside; e.g., Storage System A (0105), Storage System B (0107). A Roles field indicates which volume is acting as the primary volume and which volume is the corresponding secondary volume, for each remote copy pair. An HBA field identifies the HBA from which a volume can be accessed. An Availability field indicates if a volume is available or not. A Pair field indicates the pair status of the pair; e.g., SYNCING, SYNCED, SPLIT, REVERSE-SYNCING, REVERSE-SYNCED, and DECOUPLED.

Figure 2C:
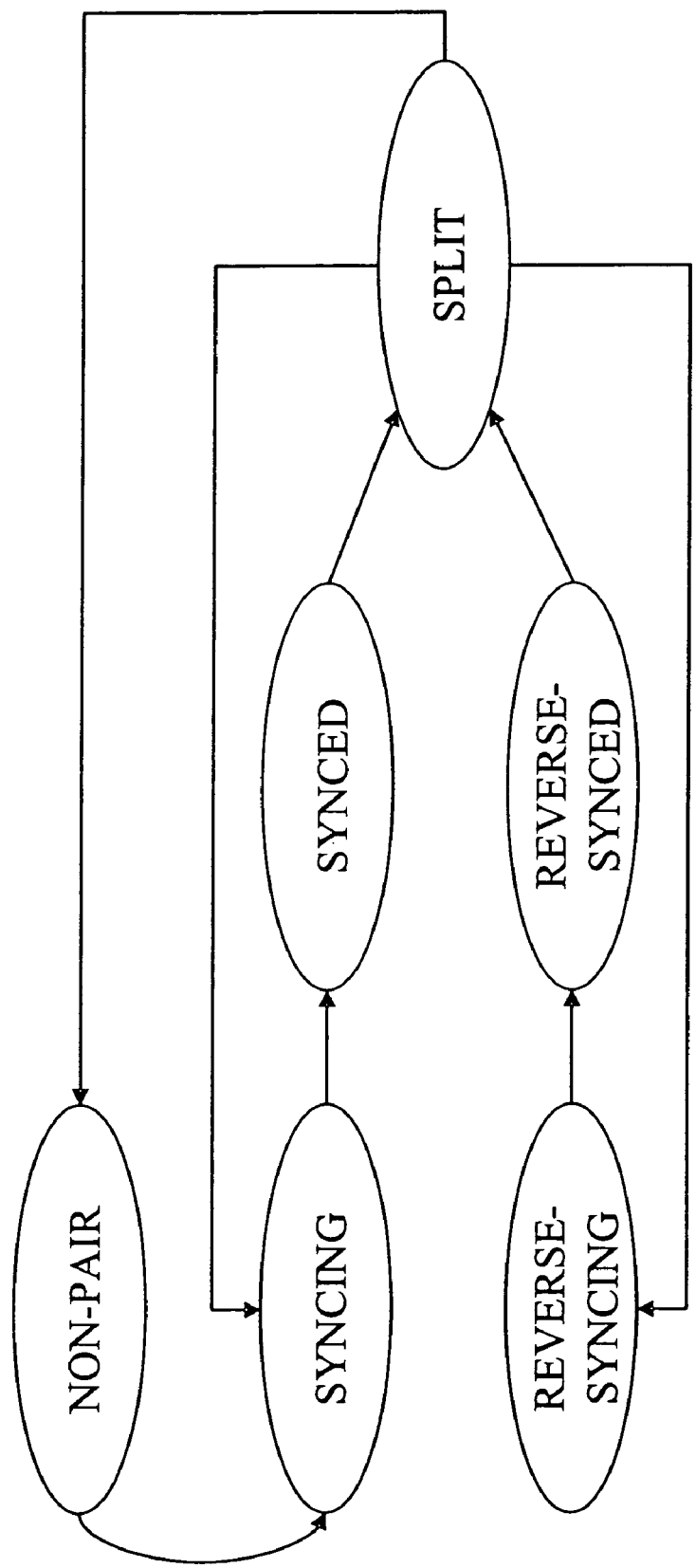
FIG. 2C shows a transition diagram of the typical pairing states of a remote copy pair.

Referring to FIG. 2C for a moment, a brief discussion of the different pairing states of a remote copy pair will be made. Consider two storage volumes. Initially, they have no relation to each in terms of remote copy and so they exist in a NON-PAIR state. When one of the volumes communicates to the other volume a command to create a remote copy pair (typically performed by the disk controller), the volumes exist in a SYNCING pair state. This signifies that the two volumes are in the process of becoming a remote copy pair. This involves copying (mirroring) the data from one volume (the primary volume) to the other volume (the secondary volume). When the copy or mirroring operation is complete, the two volumes have identical data and are now in a SYNCED state. Typically in the SYNCED state, write requests can only be serviced by the primary volume; data that is written to the primary volume is mirrored to the secondary volume (remote copy operation). In the SYNCED state, read requests may be serviced by the secondary volume.

At some point, the paired volume may be SPLIT, which means they are still considered as paired volumes. In the SPLIT state, remote copy operations are not performed when the primary volume receives and services write requests. In addition, write requests can be serviced by the secondary volume. At some point, the remote copy operations may be re-started. If during the SPLIT state, the secondary volume did not service any write requests, then we need only ensure that write requests performed by the primary volume are mirrored to the secondary volume; the volumes thus transition through the SYNCING state to the SYNCED state.

During the SPLIT state, the secondary volume is permitted to service write requests in addition to the primary the volume. Each volume can receive write requests from the same host, or from different host machines. As a result, the data state of each volume will diverge from they SYNCED state. When a subsequent re-sync operation is performed to synchronized the two volumes, there are two ways to incorporate data that had been written to the primary volume and data that had been written to the secondary volume. In the first case, any data that had been written to the secondary volume is discarded. Thus, data that was written to the primary volume during the SPLIT state is copied to the secondary volume. In addition, any blocks that were updated in the secondary volume during the SPLIT state, must be replaced with data from the corresponding blocks in the primary volume. In this way, the data state of the secondary volume is once again synchronized to the data state of the primary volume. Thus, the pair status goes from SPLIT state, to SYNCING state, to SYNCED state.

In the second case, any data that had been written to the primary volume is discarded. Thus, data that was written to the secondary volume during the SPLIT state is copied to the primary volume. In addition, any blocks that were updated in the primary volume during the SPLIT state, must be replaced with data from the corresponding blocks in the secondary volume. In this way, the data state of the primary volume is now synchronized to the data state of the primary volume. In this situation, the pair status goes from SPLIT state, to REVERSE-SYNCING state, to REVERSE-SYNCED state because of the role reversal between the primary volume and the secondary volume.

The foregoing is general explanation of remote copy operations performed by storage systems. However in the present invention, there is no such case where both the primary volume and the secondary volume will service write requests during the SPLIT state. Only one of the volumes will receive write requests from a host machine and so there is no need to discard any write data.

Returning to FIG. 2, if the virtual volume module 010105 determines that Volume X-P is not available, and it is the primary volume (as determined from the configuration table, Table I) and the pair status is SYNCED, then the virtual volume module will instruct the storage system 0107 to split the remote copy pair (i.e., the Volume X-P and Volume X-S pair). The storage system 0107 changes the pair status from SYNCED (which means that any updates on Volume X-P are reflected to Volume X-S so these two volumes remain identical, and it is not possible for a host to write data onto Volume X-S) to SPLIT (which means that Volume X-P and Volume X-S are still associated as a remote copy pair but updates made to Volume X-P are not reflected to Volume X-S and updates made to Volume X-S are not reflected to Volume X-P). The virtual volume module subsequently uses the Volume X-S in the storage system 0107 to service I/O requests made by the host, instead of Volume X-P. Referring to FIG. 2A, the Availability and Pair fields for Volume X-P and for Volume X-S would be updated as shown. Thus, in this situation, the Availability field for Volume X-P would be "No". The Availability field for Volume X-S would be "Yes". The Pair field for Volume X-P and X-S would be SPLIT.

The table in FIG. 2 is managed by the virtual volume module. So this is correct. Information required to manage pairs of volumes are managed by both storage systems because they need to know how to replicate volumes across storage systems. They keep the same information. The virtual volume module needs to ask only one of the storage systems to change the pair status and then such changes are reflected to the other storage system by communications between the storage systems. When Volume X-P is not available, the virtual volume manager is not sure where a problem is. So the virtual volume module asks Storage System B to change the status then it is storage system's responsibility to reflect the change to the other storage system. If the storage system A is alive, then the change is reflected to the storage system A; otherwise it is not.

If the virtual volume module 010105 determines that Volume X-P is not available, and it is the primary volume (as determined from the configuration table, Table I) and the pair status is SYNCING, then the virtual volume module will fail to process I/O requests from applications so the virtual volume module sends an error to the applications.

If the virtual volume module 010105 determines that Volume X-S is not available and the role of Volume X-S is the primary volume and the pair status is REVERSE-SYNCING, then the virtual volume module will communicate a command to the storage system 0105 to split the remote copy pair of Volume X-P and Volume X-S. The storage system 0105 changes the pair status from REVERSE-SYNCED (which means any updates on Volume X-S are reflected to Volume X-P and the two volumes remain identical, and it is not possible for a host to write data onto Volume X-P) to SPLIT. The virtual volume module subsequently forwards I/O operations (and other SCSI commands) to service I/O requests from the applications 010101 to the Volume X-P in the storage system 0105, instead of Volume X-S. Referring to FIG. 2B, the Availability and Pair fields for Volume X-P and for Volume X-S would be updated as shown. Thus, in this situation, the Availability field for Volume X-P would be "Yes". The Availability field for Volume X-S would be "No". The Pair field for Volume X-P and X-S would be SPLIT.

If the virtual volume module 010105 determines that Volume X-S is not available, and it is the primary volume (as determined from the configuration table, Table I) and the pair status is REVERSE-SYNCING, then the virtual volume module will fail to process I/O requests from applications so the virtual volume module sends an error to the applications.

As discussed above, when Volume X-P becomes unavailable, the virtual volume module 010105 begins to use Volume X-S. When Volume X-P becomes available, the virtual volume manager sends a reverse-sync request to the storage system 0107. The purpose of doing this is to re-establish Volume X-P as the primary volume. The reverse-sync request initiates an operation to copy data that was written to Volume X-S, during the time that Volume X-P was unavailable (i.e., subsequent to the SPLIT), back to Volume X-P. Recall that Volume X-P is initially the primary volume and Volume X-S is the secondary volume.

In response to receiving the reverse-sync request, the disk controller 010703 changes the pair status of the pair to REVERSE-SYNCING and responds with a suitable response to the host 0101. The disk controller 010703 begins copying data that was written to Volume X-S during the SPLIT state to Volume X-P. Typically, a write request logging mechanism is used to determine which blocks on the volume had changed and in which order. Typically, the copy of changed blocks from Volume X-S to Volume X-P is performed asynchronously from processing new I/O requests from hosts, meaning that during this copy, the disk controller accepts I/O requests from the hosts to Volume X-S. When the copy is complete, the volumes become identical, and the pair status is changed to REVERSE_SYNCED status.

After the pair status changed to REVERSE_SYNCING, the virtual volume module 010105 then updates the table shown in FIG. 2. The virtual volume module then changes the role of Volume X-S to primary volume (the Role field for Volume X-S is set to "Primary") and the role of Volume X-P to secondary volume (the Role field for Volume X-P is set to "Secondary"). The Availability field for Volume X-P is changed to "Yes".

If a user subsequently, wants to use Volume X-P as the primary volume, the virtual volume module 010105 communicates with the storage system 0107 to determine whether the pair status is REVERSE-SYNCED or not. If not, then the virtual volume module 010105 waits for the state to be achieved. The REVERSE-SYNCED state means data in Volume X-S is identical to the data in Volume X-P.

The virtual volume module stops processing any more I/O requests from applications. I/O requests are queued in a wait queue which a virtual volume module manages.

The virtual volume module 010105 split the pair. Disk controller 010503 and disk controller 010703 change the status to SPLIT.

The disk controller 010503 informs the host 0101 that the SPLIT has occurred. In response, the virtual volume module 010105 then changes the role of Volume X-P to primary volume in the table shown in FIG. 2, and the role of Volume X-S is changed to secondary volume.

The virtual volume module starts to processing I/O requests in the wait queue and new I/O requests from applications. At this time, I/O requests are issued by a host to Volume X-P.

The virtual volume module resyncs the pair comprising Volume X-P and Volume X-S. Disk controllers 010503 and 010703 change the pair status to SYNCING. Data which has been written to Volume X-P is copied to Volume X-S. During this copy, a disk controller accepts I/O requests from a host to Volume X-P. Data that is subsequently written to Volume X-P will then be copied to Volume X-S synchronously. When the copy has completed, the volume pairs contain identical data. The disk controller 010503 changes the pair status from SYNCING to SYNCED and then informs the host 0101 that the pair has been re-synced.

Operation of the disk controllers 010503 and 010703 will now be discussed. Suppose the disk controller 010503 receives a data write request from the host 0101. If the pair status of the pair consisting of Volume X-P and Volume X-S is in the SYNCING or SYNCED state, then the disk controller 010503 writes the data to Volume X-P. If there is a failure during the attempt to perform the write operation to service the write request, a suitable error message is returned to the host 0101. Assuming the write operation to Volume X-P is successful, then the disk controller 010503 will send the data to the storage system 0107 via the FC network 010305. It is noted that the data can be cached in the cache 010507 before being actually written to Volume X-P.

Upon receiving the data from the disk controller 010503, the disk controller 010703 in the storage system 0107 will write the data to Volume X-S. The disk controller 010703 sends a suitable response back to the disk controller 010503 indicating a successful write operation. Upon receiving a positive indication from the disk controller 010703, the disk controller 010503 in the storage system 0105 will communicate a response to the host 0101 indicating that the data was written to Volume X-P and to Volume X-S. It is noted that the data can be cached in the cache 010707 before being actually written to Volume X-S.

If on the other hand, the disk controller 010703 encounters an error in writing to Volume X-S, then it will send a suitable negative response to the storage system 0105. The disk controller 010503, in response, will send a suitable response to the host 0101 indicating that the data was written to Volume X-P, but not to Volume X-S.

Suppose the disk controller 010503 receives a write request and the pair status of Volume X-P and Volume X-S is SPLIT. The disk controller 010503 will perform a write operation to Volume X-P. If there is a failure during this attempt, then the disk controller will respond to the host 0101 with a response indicating the data could not be written to Volume X-P. If the write operation to Volume X-P succeeded, then a suitable positive response is sent back to the host 0101. It is noted that the data can be cached in the cache 010507 before being actually written to Volume X-P. Since the pair status is SPLIT, there is no step of sending the data to the storage system 0107. The disk controller 010503 logs write requests in its memory or a temporary disk space. By using the log, when the pair status is changed to SYNCING, the disk controller 010503 can send the write requests being kept in the log to the disk controller 010703 in the order of which the disk controller 010503 received the write requests from a host.

Suppose that the disk controller 010703 receives a data write request from the host 0101. If the status of the volume pair of Volume X-P and Volume X-S is SYNCING or SYNCED, then the disk controller 010703 will reject the request and send a response to the host 0101 indicating that the request is being rejected. No attempt to service the write request from the host 0101 will be made.

If the status of the volume pair is SPLIT, then the disk controller 010703 will service the write operation and write the data to Volume X-S. A suitable response indicating the success or failure of the write operation is then sent to the host 0101. It is noted that the data can be cached in the cache 010707 before being actually written to Volume X-S.

If the status of the volume pair is REVERSE-SYNCED, then the disk controller 010703 services the write request by writing to Volume X-S. If the write operation fails, then a suitable response indicating the success or failure of the write operation is sent to the host 0101.

If the write operation to Volume X-S was successful, then the disk controller 010703 will send the data to the storage system 0105 via the FC Network 010305. The disk controller 010503 writes the received data to Volume X-P. The disk controller 010503 will communicate a message to the storage system 0107 indicating the success or failure of the write operation. If the write operation to Volume X-P was successful, then, the disk controller 010703 will send a response to the host 0101 indicating that the data was written to both Volume X-S and to Volume X-P. If an error occurred during the write attempt to Volume X-P, then the disk controller 010703 will send a message indicating the successful write to Volume X-S and a failed attempt to Volume X-P.

Suppose the disk controller 010503 receives a data write request from the host 0101 when the volume pair is in the REVERSE-SYNCING or REVERSE-SYNCED state. The disk controller 010503 would respond with an error message to the host 010 indicating that the request is being rejected and thus no attempt to service the write request will be made.

Figure 6:
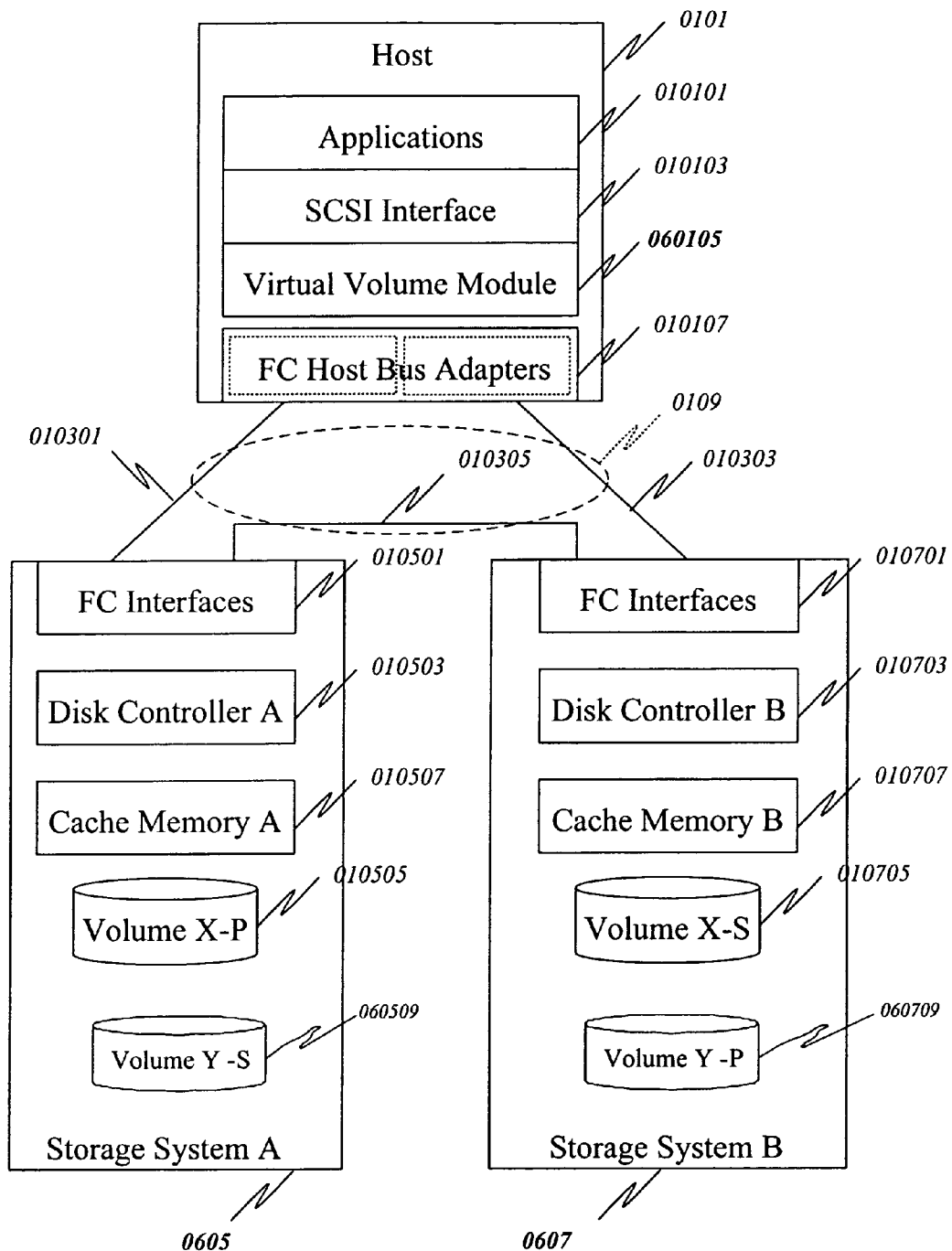
FIG. 6 is a block diagram showing a configuration of a computer system to which a variation of the first embodiment of the present invention is applied.
Figure 7:
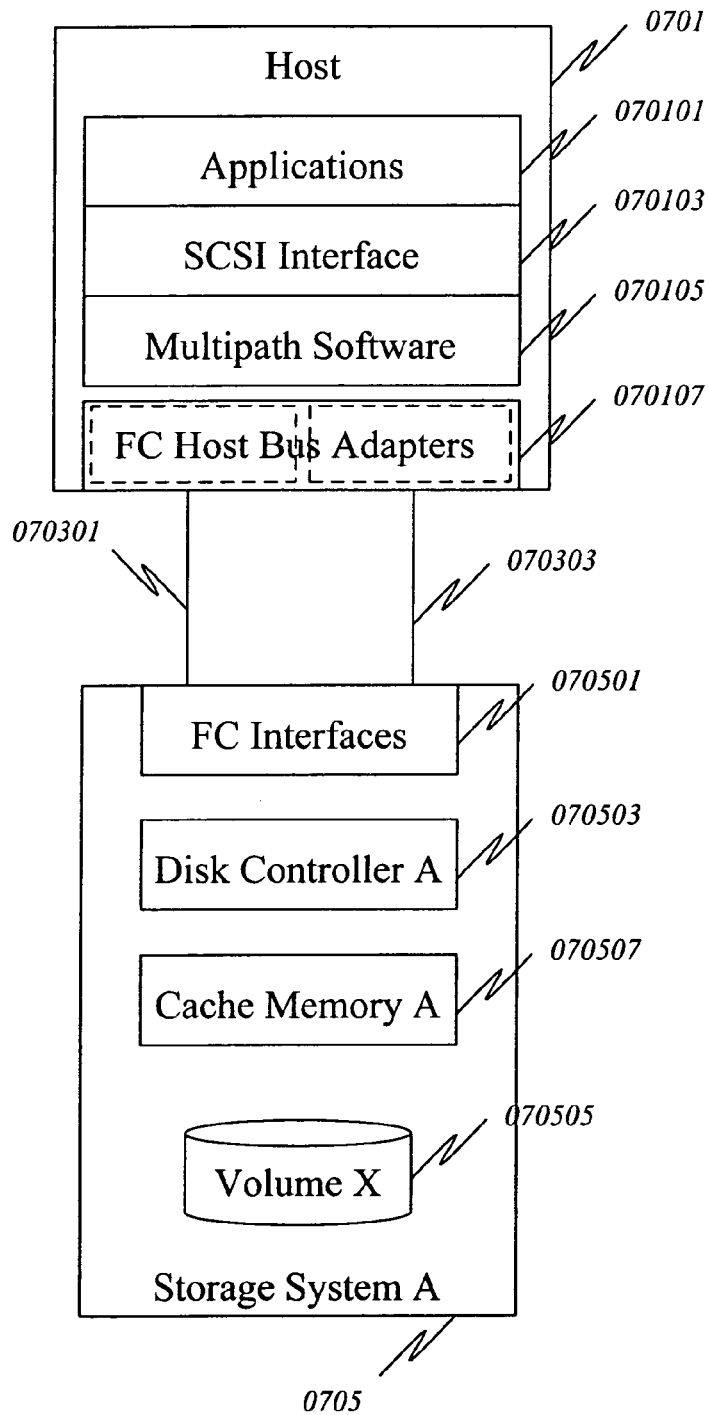
FIG. 7 shows a conventional multipath configuration in a storage system.
Figure 8:
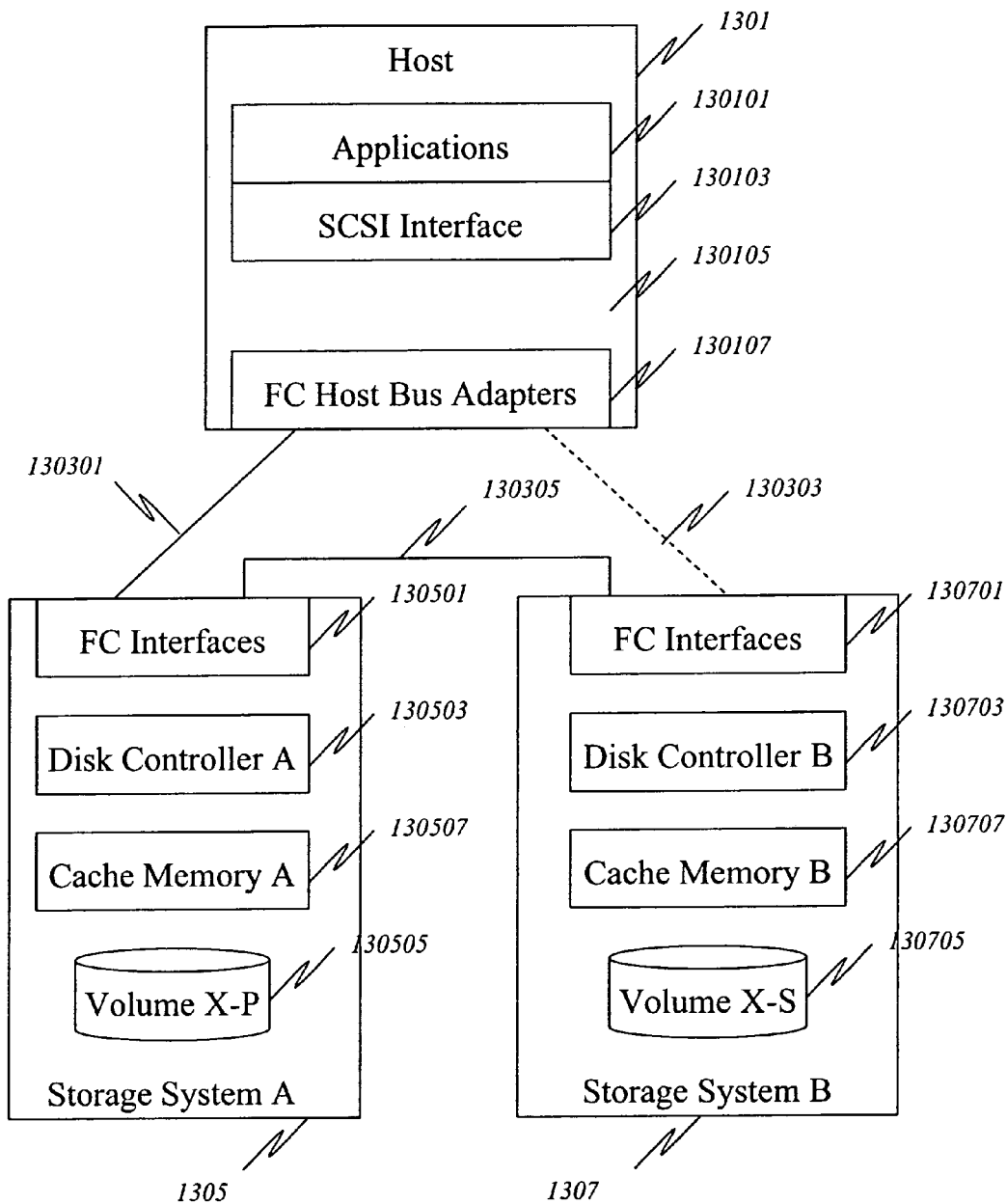
FIG. 8 shows a conventional data migration configuration in a storage system.
Figure 9:
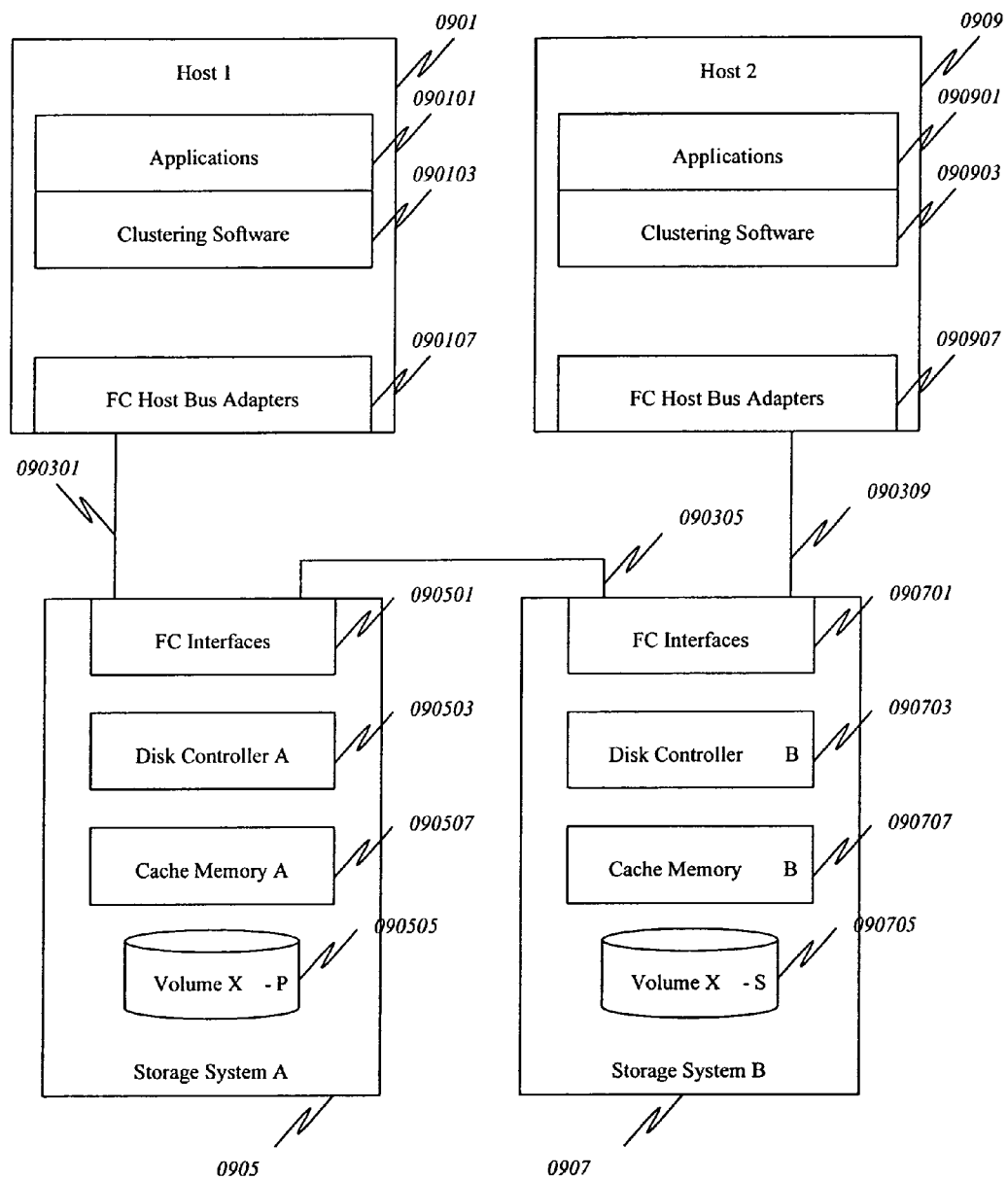
FIG. 9 shows a conventional server clustering configuration in a storage system.
Figure 10:
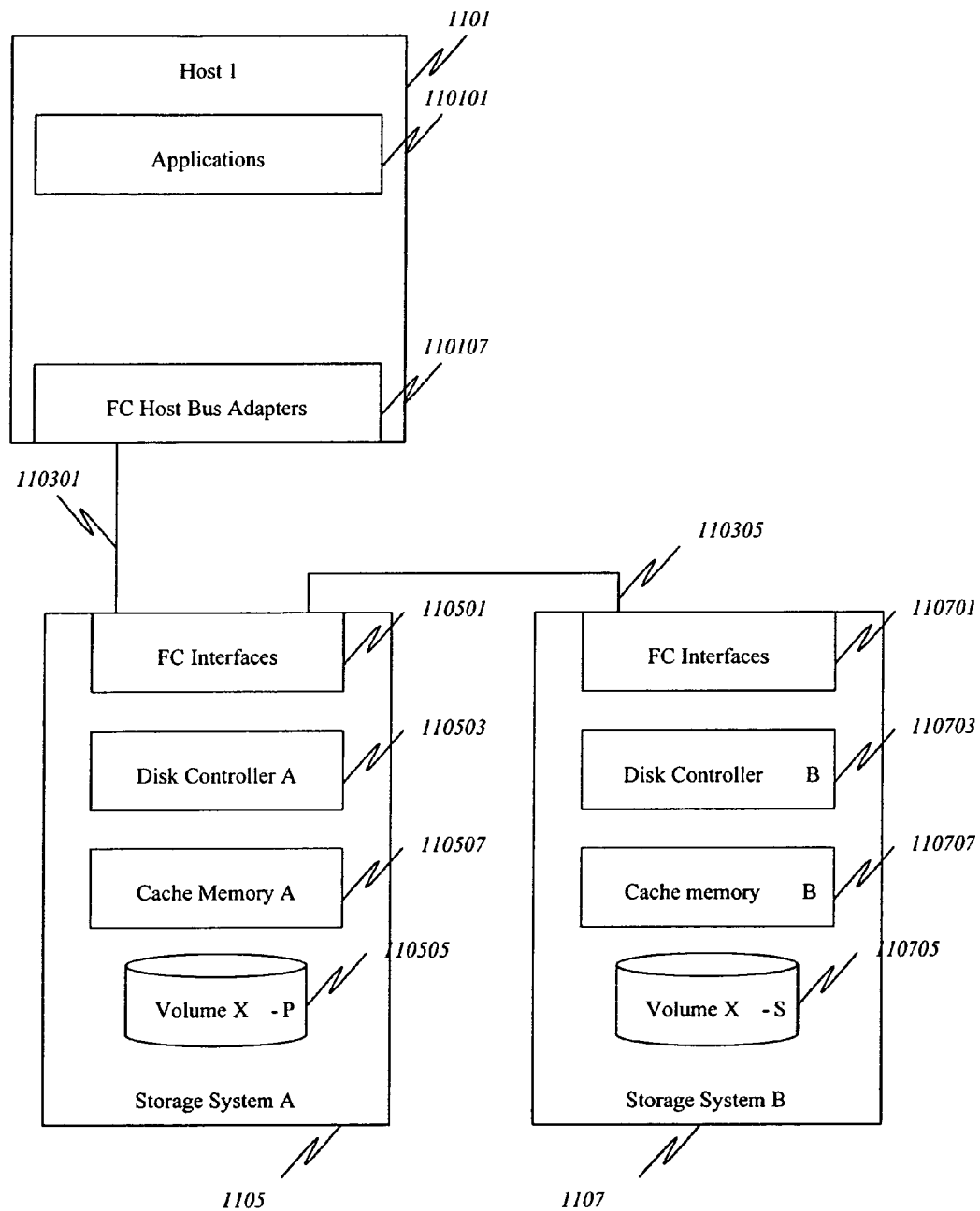
FIG. 10 shows a conventional remote data replication configuration in a storage system.

Refer for a moment to FIG. 6. This figure illustrates a variation of the embodiment of the present invention shown in FIG. 1 for load balancing of I/O. Here, the storage system 0605 includes a second volume 060509 (Volume Y-S). The storage system 0607 includes a second volume 060709 (Volume Y-P). Two path failover configurations are provided: Volume X-P and Volume X-S constitute one path failover configuration, where Volume X-P on the storage system 0605 serves as the production volume and Volume X-S serves as the backup. Volume Y-P and Volume Y-S constitute another path failover configuration, where Volume Y-P on the storage system 0607 serves as the production volume and Volume Y-S serves as the backup. The virtual volume module 060105 executing on the host machine 0101 in this variation of the embodiment shown in FIG. 1 can service I/O requests from the applications 010101 by sending corresponding I/O operations to either Volume X-P or Volume Y-P. Since the two production volumes are in separate storage systems, I/O can be load balanced between the two storage systems. Thus, the selection of Volume X-P or Volume Y-P can be made based on load-balancing criteria (e.g., load conditions in each of the volumes) in accordance with conventional load-balancing methods. This configuration thus, offers load-balancing with the failover handling of the present invention.

Embodiment 2

FIG. 1 also illustrates a second aspect of the present invention. This aspect of the present invention relates to non-disruptive data migration.

Generally in accordance with this second aspect of the present invention, a host system includes a virtual volume module in data communication with a first storage system. A second storage system is provided. The virtual volume module can initiate a copy operation in the first storage system so that data stored on the first storage system is migrated to the second storage system. The virtual volume module can periodically monitor the status of the copy operation. In the meanwhile, the virtual volume module receives I/O requests from applications running on the host and services them by accessing the first storage system. When the migration operation has completed, the virtual volume module can direct I/O requests from the applications to the second storage system. Following is a discussion of an illustrative embodiment of this aspect of the present invention.

As mentioned, the system configuration shown in FIG. 1 can be used to explain this aspect of the present invention. For this aspect of the present invention, suppose Storage System A 0105 is a pre-existing (e.g., legacy) storage system. Suppose further that Storage System B 0107 is a replacement storage system. In this situation, it is assumed that storage system 0107 will replace the legacy storage system 0105. Consequently, it is desirable to copy (migrate) data from Volume X-P in the storage system 0105 to Volume X-S in storage system 0107. Moreover, it is desirable to do this on a "live" system, where users can access Volume X-P during the data migration.

As in the first aspect of the present invention, the virtual volume module discovers Volume X-P and Volume X-S. A configuration file stored in the host 0101 includes the following information:

TABLE II

Configuration File

Data Migration Set: DMS1

Primary Volume: Volume X-P in Storage System A
Secondary Volume: Volume X-S in Storage System B
Virtual Volume Name: VVolX
Data Migration Set: DMS2

Primary Volume: Volume Y-P in Storage System C
Secondary Volume: Volume Y-S in Storage System B
Virtual Volume Name: VVolY This table can be used to initialize the virtual volume module 010105. Alternatively, a command line interface as discussed above can be used to communication the above information to the virtual volume module.

This configuration table identifies data migration volume sets. The primary volume indicates a legacy (old) storage volume. The secondary volume designates a new storage volume. As in Embodiment 1, the virtual volume module 010105 presents applications 010101 running on the host 0101 with a virtual storage volume.

Remote copy technology is used in this embodiment of the present invention. However, it will be appreciated that any suitable data duplication technology can be adapted in accordance with the present invention. Thus, in this embodiment of the present invention, the primary volume serves the role of the legacy storage system. The secondary volume serves the role of a new storage system.

When a data migration operation is initiated, the virtual volume module 010105 communicates a request to the storage system 0105 to create a data replication pair between the primary volume that is specified in the configuration file (here, Volume X-P) and the secondary volume that is specified in the configuration file (here, Volume X-S). The disk controller 010503, in response, will set the volume pair to the RESYNCING state. The disk controller then initiates data copy operations from Volume X-P to Volume X-S. This is typically a background process, thus allowing for servicing of I/O requests from the host 0101. Typically, a bitmap or some similar mechanism is used to keep track of which blocks have been copied.

If the storage system 0105 receives a data write request during the data migration, the disk controller in the storage system 0105 will then write the data to the targeted data blocks in Volume X-P. After that the disk controller 010503 will write the received to data to the storage system 0107. The disk controller 010703 will write the data to Volume X-S and respond to the disk controller 010503 accordingly. The disk controller 010503 will the respond to the host 0101 accordingly.

When the data migration has completed, the disk controller 010503 will change the volume pair status to SYNCED.

As discussed above, the virtual volume module 010105 provides a virtual volume to the applications 010101 running on the host 0101 via the SCSI interface 010103. The applications can issue any SCSI command (including I/O related commands) to the SCSI interface. The virtual volume module 010105 intercepts the SCSI commands and issues suitable corresponding requests to the storage system 0105 to service the command.

In accordance this second aspect of the present invention, the virtual volume module 010105 periodically checks the pair status of the Volume X-P/Volume X-S pair. When the pair status is SYNCED, the virtual volume module will communicate a request to the disk controller 010503 to delete the pair. The disk controller 010503 will then take steps to delete the volume pair, and will stop any data copy or data synchronization between Volume X-P and Volume X-S. The disk controller 010503 will then respond to the host 0101 with a response indicating completion of the delete operation. It is noted that I/O requests from the host 0101 during this time are not processed. They are merely queued up. To the applications 010101, it will appear as if the storage system (the virtual storage system as presented by the virtual volume module 010105) is behaving slowly.

When the virtual volume module 010105 receives a positive response from the disk controller 010503 indicating the delete operation has succeeded, then the entry in the configuration table for the data migration pair consisting of Volume X-P and Volume X-S is eliminated. I/O requests that have queued up will now be serviced by the storage system 0107. Likewise, when the virtual volume module receives subsequent SCSI commands, it will direct them to the storage system 0107 via the FC channel 010303.

This aspect of the present invention allows for data migration to take place in a transparent fashion. Moreover, when the migration has completed, the old storage system 0105 can be taken offline without disruption of service to the applications 010101. This is made possible by the virtual volume module which transparently redirects I/O to the storage system 0107 via the communication link 010303.

Operation of the disk controller 010503 and of the disk controller 010703 is as discussed above in connection with the first embodiment of the present invention.

Embodiment 3

Figure 3:
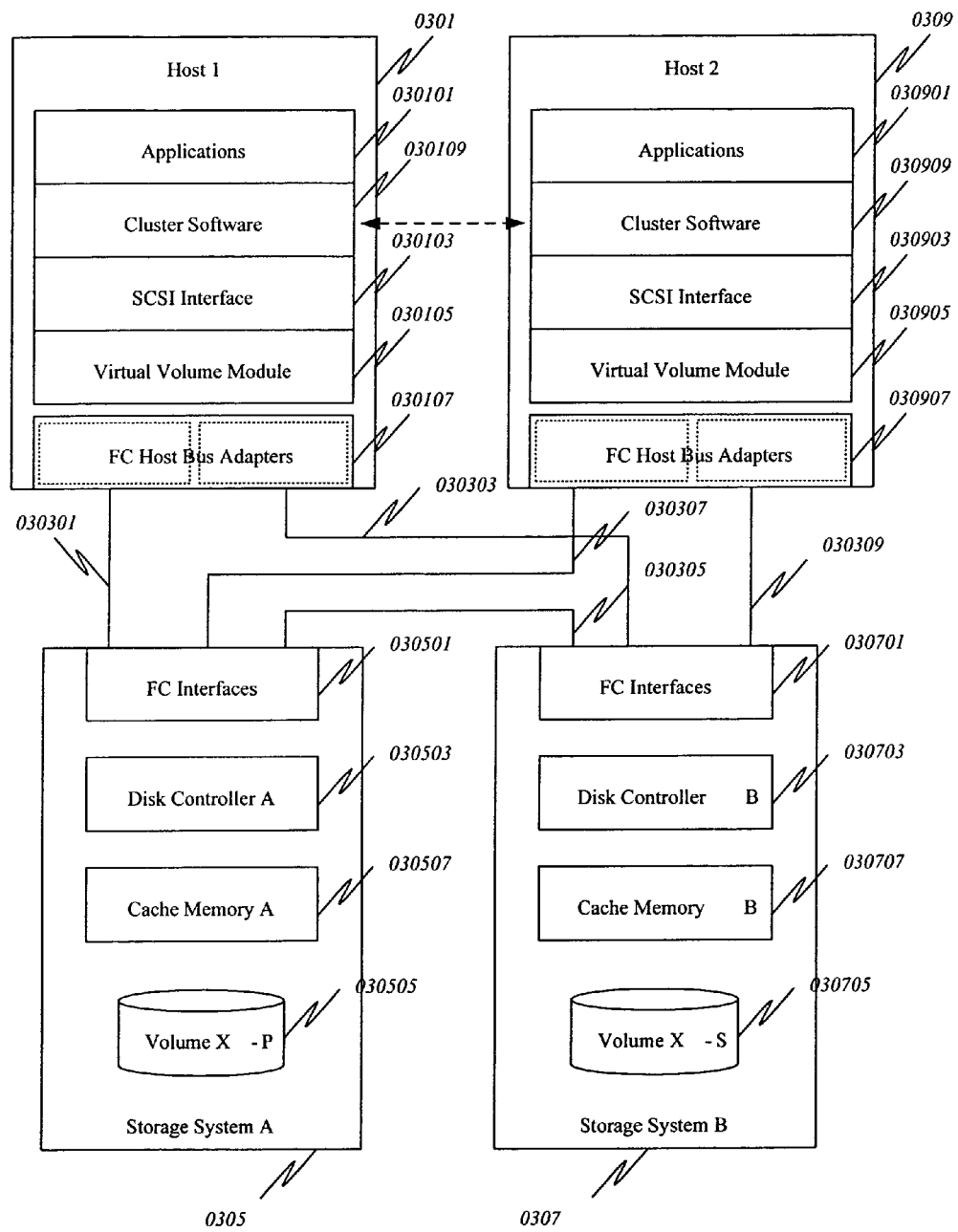
FIG. 3 is a block diagram showing a configuration of a computer system to which a third embodiment of the present invention is applied.

FIG. 3 shows an embodiment of a system according to a third aspect of the present invention. This aspect of the present invention reduces the time for failover processing.

Generally in accordance with this third aspect of the present invention, a first host and a second host are configured for clustering. Each host can access a first storage system and a second storage system. The first storage system serves as a production storage system. The second storage system serves as a backup to the primary storage system. A virtual volume module in each host provides a virtual volume view to applications running on the host. By default, the virtual volume modules access the first storage system (the production storage system) to service I/O requests from the hosts. When a host detects that the other host is not operational, it performs conventional failover processing to take over the failed host. The virtual volume modules are configured to detect a failure in the first storage system. In response, subsequent access to storage is directed by the virtual volume modules to the second storage system. If the virtual volume module in the second host detects a failure of the first storage system, the virtual volume module will direct I/O requests to the second storage system. An illustrative embodiment of this aspect of the present invention will now be discussed.

FIG. 3 shows one or more FC networks. An FC network 030301 connects a host 0301 to a storage system 0305 (Storage System A); Storage System A is associated with the host 0301. An FC network 030303 connects the host 0301 to a storage system 0307 (Storage System B). An FC network 030307 connects a host 0309 to the storage system 0305. An FC network 030309 connects the host 0309 to the storage system 0307; Storage System B is associated with the host 0309. It can be appreciated that other types of networks can be used; e.g., InfiniBand and Ethernet. It can also be appreciated that FC switches which are not shown in the figure can be used to create Storage Area Networks (SAN) among the host and the storage systems.

Each storage system 0305, 0307 includes one or more FC interfaces 030501, 030701, one or more disk controllers 030503, 030703, one or more cache memories 030507, 030707, and one or more volumes 030505, 030705.

Storage system 0305 provides a volume designated as Volume X-P 030505 for storing data. Storage system 0307, likewise, provides a volume designated as Volume X-S 030705 for storing data. A volume is a logical unit of storage that is composed of one or more physical disk drive units. The physical disk drive units that constitute the volume can be part of the storage system or can be external storage that is separate from the storage system.

The hosts 0301, 0309 are configured in a manner similar to the host 0101 shown in FIG. 1. For example, each host 0301, 0309 includes respectively one or more FC HBA's 030107, 030907 for connection to the respective FC network. FIG. 3 shows that each host 0301, 0309 includes two FC HBA's.

Each host 0301, 0309 includes respectively a virtual volume module 030105, 030905, a SCSI Interface 030103, 030903, Cluster Software 030109, 030909, and one or more applications 030101, 030901. The underlying OS on each host can be any suitable OS, such as Windows 2000/XP/2003, Linux, UNIX, MVS, etc. The OS can be different for each host.

User-level applications 030101, 030901 includes typical applications such as database systems, but of course can be any software that has occasion to access data on a storage system. Typical system-level applications include system services such as file systems and volume managers. Typically, there is data associated with an access request, whether it is data to be read from storage or data to be written to storage.

The cluster software 030109, 030909 cooperate to provide load balancing and failover capability. A communication channel indicated by the dashed line provides a communication channel to facilitate operation of the cluster software in each host 0301, 0309. For example, a heartbeat signal can be passed between the software modules 030109, 030909 to determine when a host has failed. In the configuration shown, the cluster software components 030109, 030903 are configured for ACTIVE-ACTIVE operation. Thus, each host can serve as a standby host for the other host. Both hosts are active and operate concurrently to provide load balancing between them and to serve as standby hosts for each other. Both hosts access the same volume, in this case Volume X-P. The cluster software manages data consistency between the hosts. An example of this kind of cluster software is Real Application Clusters by Oracle Corporation.

The SCSI interface 030103, 030903 in each host 0301, 0309 is configured as discussed above in FIG. 1. Similarly, the virtual volume modules 030105, 030905 are configured as in FIG. 1, to provide virtual volumes to the applications running on their respective host machines 0301, 0309. The storage systems 0305 and 0307 are similarly configured as described in FIG. 1.

In operation, each virtual volume module 030105, 030905 functions much in the same way as discussed in Embodiment 1. The cluster software 030109, 030909 both access Volume X-P 030505 in the storage system 0305 as the primary (production) volume; the secondary volume is provided by Volume X-S 030705 in the storage system 0307 and serves as a backup volume. The virtual volume module configures Volume X-P and Volume X-S as a remote copy pair, by sending appropriate commands to the disk controller 030503. The volumes pair is initialized to be in the PAIR state by the disk controller 030503. In the pair state, the disk controller 030503 copies data that is written to Volume X-P to Volume X-S.

As mentioned above, the cluster software 030109, 030909 is configured for ACTIVE-ACTIVE operation. Each host 0301, 0309 can access Volume X-P for I/O operations. The cluster software is responsible for maintaining data integrity so that both hosts 0301, 0309 can access the volume. For example, cluster software 030109 (or 030909) first obtains a lock on all or a portion of Volume X-P before it writes data to Volume X-P, so that only one host at a time can write data to the volume.

If one host fails, applications running on the surviving host can continue to operate; the cluster software in the surviving host will perform the necessary failover processing for a failed host. The virtual volume module of the surviving host is not aware of such failure. Consequently, the virtual volume modules do not perform any failover processing, and will continue to access Volume X-P to service I/O requests from applications executing on the surviving host.

If, on the other hand, the storage system 0305 fails, the virtual volume module in each host 0301, 0309 will detect the failure and perform a failover process as discussed in Embodiment 1. Thus, both virtual volume modules will issue a split command to the primary storage system 0305. The disk controller 030503 will change the volume pair status to SPLIT, in response to receiving the first split command which the disk controller received. The disk controller will ignore the second split command. The virtual volume modules 030103, 030903 will then reconfigure themselves so that subsequent I/O requests from the hosts 0301, 0309 can then be serviced by communicating with Volume X-S. The cluster software continues to operate without being aware of the failed storage system since the failover processing was handled by the virtual volume modules 030105, 030905. If the pair status is SYNCING or REVERSE-SYNCING, the split command is failed. As the result, the hosts can not continue to work or failed.

If one of the hosts and the primary storage system both fail, then the cluster software in the surviving host will perform failover processing to handle the failed host. The virtual volume module in the surviving host will perform path failover as discussed above for Embodiment 1 to provide uninterrupted service to the applications running on the surviving host. The virtual volume module in the surviving host will direct I/O requests to the surviving storage system. It is noted that there is no synchronization is required between the cluster software and the virtual volume module because the cluster software doesn't see any storage system or any volume failure.

Embodiment 4

Figure 4:
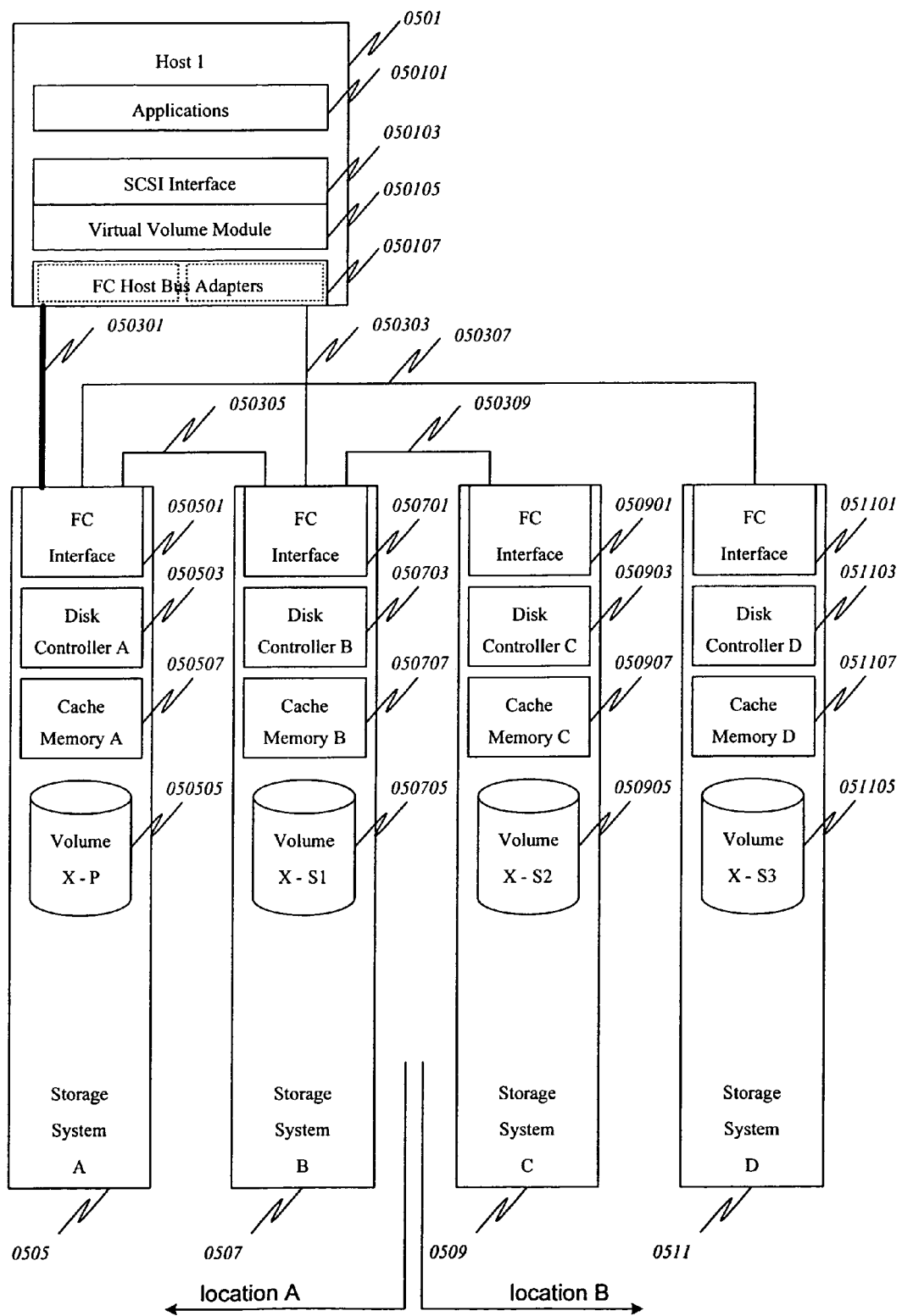
FIG. 4 is a block diagram showing a configuration of a computer system to which a fourth embodiment of the present invention is applied.

FIG. 4 shows an embodiment of a fourth aspect of the present invention, in which redundant data replication capability is provided.

Generally in accordance with this fourth aspect of the present invention, a host is connected to first and second storage systems. A virtual volume module executing on the host provides a virtual volume view to applications executing on the host machine. The first storage system is backed up by the second storage system. The virtual volume module can perform a failover to the second storage system if the first storage system fails. Third and fourth storage systems serves as backup systems respectively for the first and second storage systems. Thus, data backup can continue if either the first storage system fails or if the second storage system fails. A discussion of an illustrative embodiment of this aspect of the present invention follows.

In the configuration shown in FIG. 4, an FC network 050301 provides a data connection between a host 0501 and a first storage system 0505 (Storage System A). An FC network 050303 provides a data connection between the host 0501 and a second storage system 0507 (Storage System B). An FC network 050305 provides a data connection between the storage system 0505 and the storage system 0507. An FC network 050309 provides a data connection between the storage system 0507 and a third storage system 0509 (Storage System C). An FC network 050307 provides a data connection between the storage system 0505 and a fourth storage system 0511 (Storage System D). It can be appreciated of course that other types of networks can be used instead of FC; for example, InfiniBand and Ethernet. It can be further appreciated that FC switches (not shown) can be used to create a storage area network (SAN) among the storage systems. It will be understood that other storage architectures can also be used.

Each storage system 0505, 0507, 0509, 0511 includes one or more FC interfaces 050501, 050701, 050901, 051101, one or more disk controllers 050503, 050703, 050903, 051103, one or more cache memories 050507, 050707, 050907, 051107 and one or more volumes 050505, 050705, 050905, 051105.

Storage system 0505 provides a volume designated as Volume X-P 050505 for storing data. Storage systems 0507, 0509, 0511 likewise, provide volumes designated as Volume X-S 050705, Volume X-S2 050905, Volume X-S3 051105 for storing data. A volume is a logical unit of storage that is composed of one or more physical disk drive units. The physical disk drive units that constitute the volume can be part of the storage system or can be external storage that is separate from the storage system.

The host 0501 and the storage systems 0505, 0507 are located at a first data center in a location A. The storage systems 0509, 0511 are located in another data center at a location B that is separate from location A. Typically, location B is a substantial distance from location A; e.g., different cities. The two data centers can be connected by a WAN, so the FC networks 050307, 050309 pass through the WAN.

The host 0501 includes one or more FC HBA's 050107. In the embodiment shown, the host includes two FC HBA's. The host includes a virtual volume module 050105, a SCSI interface 050103, and one or more user applications 050101. It can be appreciated that a suitable OS is provided on the host 0501, such as Windows 2000/XP/2003, Linux, UNIX, and MVS. The virtual volume module 050105 provides a virtual volume view to the applications 050101 as discussed above.

In operation, the virtual volume module 050105 operates in the manner as discussed in connection with Embodiment 1. Particular aspects of the operation in accordance with this embodiment of the invention include the virtual volume module using Volume X-P 050505 in the storage system 0505 as the primary volume and Volume X-S 1050705 in the storage system 0507 as the secondary volume. The primary volume serves as the production volume for I/O operations made by the user-level and system-level applications 050101 running on the host 0501.

The virtual volume module 050105 configures the storage systems for various data backup/replication operations, which will now be discussed. The disk controller 050503 in the storage system 0505 is configured for remote copy operations using Volume X-P and Volume X-S1 as the remote copy pair. Volume X-P serves as the production volume to which the virtual volume module 050105 directs I/O operations to service data I/O requests from the applications 050101. In the storage system 0505, remote copy takes place via the FC network 050305, where Volume X-P is the primary volume and Volume X-S1 is the secondary volume. The remote copy operations are performed synchronously.

Redundant replication is provided by the storage system 0505. Volume X-P and Volume X-S3 051105 are paired for remote copy operations via the FC network 050307. Volume X-P is the primary volume and Volume X-S3 is the secondary volume. The data transfers can be performed synchronously or asynchronously. This is a user choice which one the user selects, synchronous replication or asynchronous replication. Synchronous replication provides no data loss but a short distance replication and sometimes slower I/O performance of a host. Asynchronous replication provides a long distance replication and no I/O performance degradation at a host but may lost data when a primary volume is broken. There is a tradeoff.

As mentioned above, synchronous data transfer from device A to device B means that device A writes data to its local volume and then sends the data to device B and then waits for a response to the data transfer operation from device B before device A sends a response to a host. With asynchronous data transfer, device A sends a response to a host immediately after device A writes data to its local volume. The written data is transferred to device B after the response. This data transfer is independent from processing I/O requests from a host by device A.

Continuing, redundant replication is also provided by the storage system 0507. Volume X-S1 and Volume X-S2 050905 form a remote copy pair, where Volume X-S is the primary volume and Volume X-S2 is the secondary volume. The data transfer can be synchronous or asynchronous.

During normal operation, the virtual volume module 050105 receives I/O requests via the SCSI interface 050103, and directs corresponding I/O operations to Volume X-P, via the FC network 050301, as shown in FIG. 4 by the bolded line. Data replication (by way of remote copy operations) occurs between Volume X-P and Volume X-S1, where changes to Volume X-P are copied to Volume X-S1 synchronously. Data replication (also by way of remote copy operations) occurs between Volume X-P and Volume X-S3, where changes to Volume X-P are copied to Volume X-S3 synchronously or asynchronously; this is a redundant replication since Volume X-S1 also has a copy of Volume X-P. Data replication (also by way of remote copy operations) occurs between Volume X-S1 and Volume X-S2, where changes to Volume X-S1 are copied to Volume X-S2 synchronously or asynchronously.

Figure 4A:
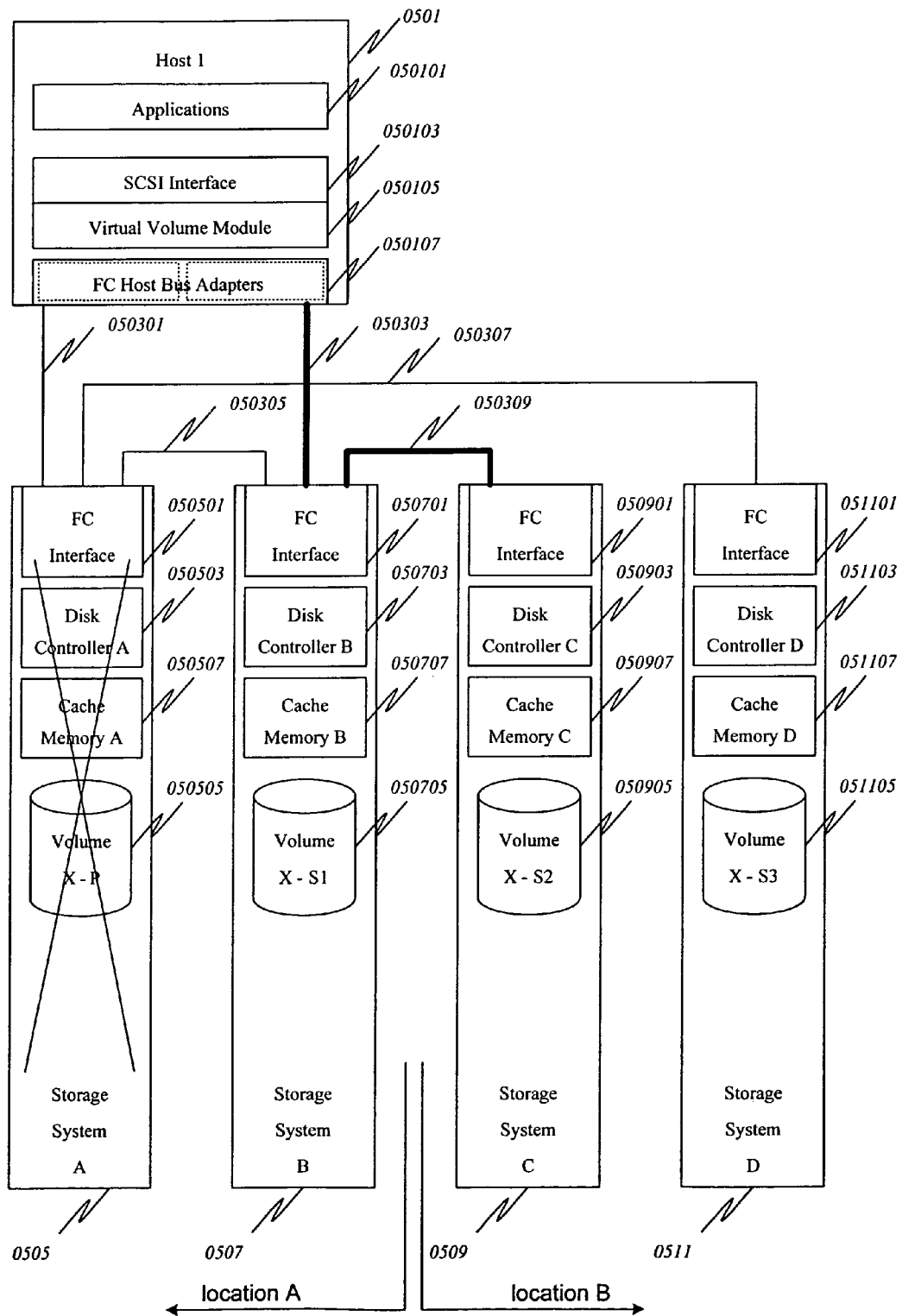
FIG. 4A shows failover processing when the production volume fails.

Consider FIG. 4A, where the storage system 0505 has failed. The virtual volume module 050105 will detect this and will perform failover processing to Volume X-S1 as discussed in Embodiment 1. Thus, I/O processing can continue with Volume X-S1. In addition, data replication (backup) continues to the provided by the volume pair of Volume X-S1 and Volume X-S2.

Figure 4B:
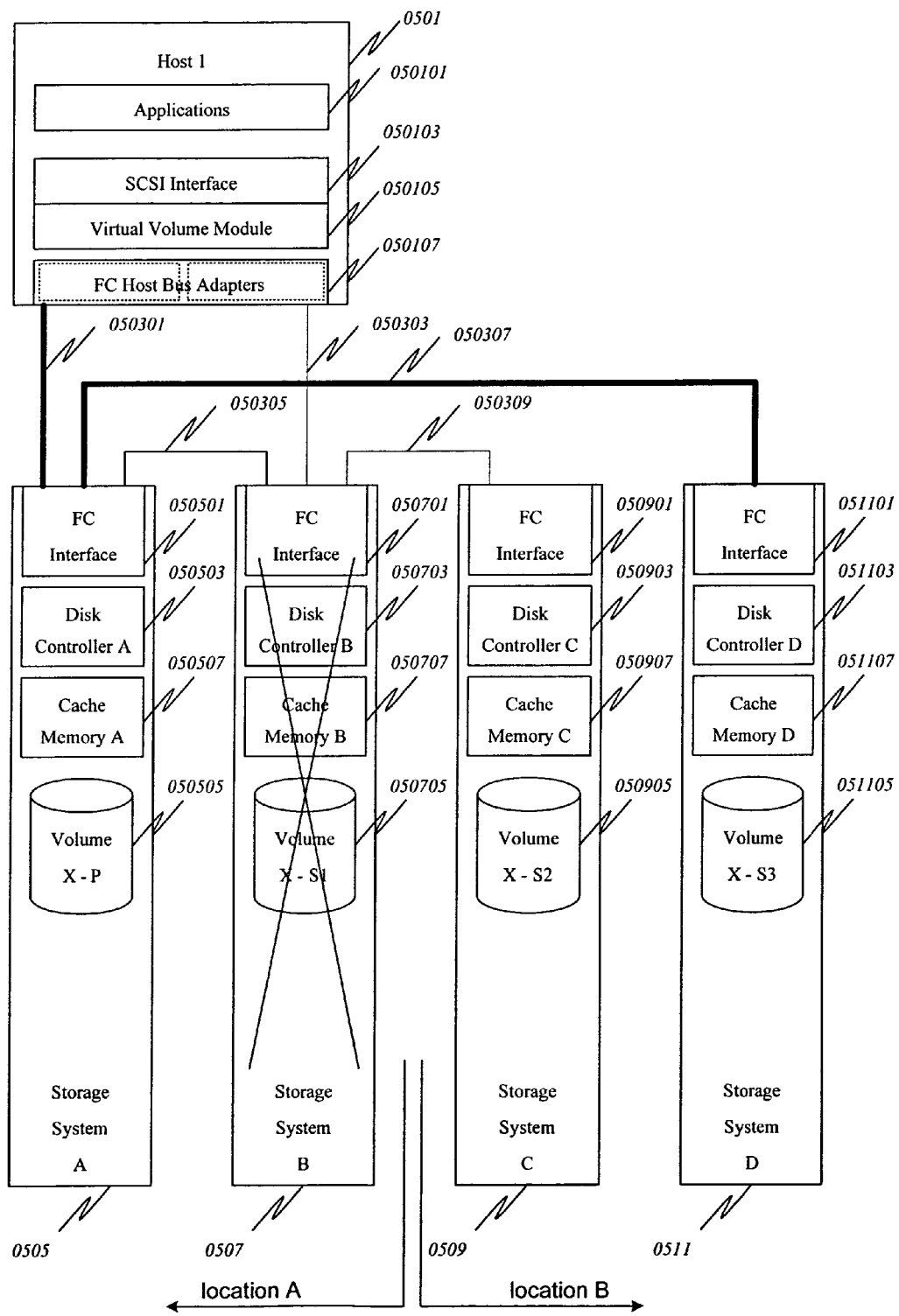
FIG. 4B shows failover processing when the backup volume fails.

Consider FIG. 4B, where the storage system 0507 has failed. The virtual volume module 050105 will continue to direct I/O operations to Volume X-P, since Volume X-P remains operational. Data replication will not occur between Volume X-P and Volume X-S1 due to the failure of the storage system 0507. However, data replication will continue between Volume X-P and Volume X-S3. The configuration of FIG. 4, therefore, is able to provide redundancy for data backup and/or replication capability.

Embodiment 5

Figure 5:
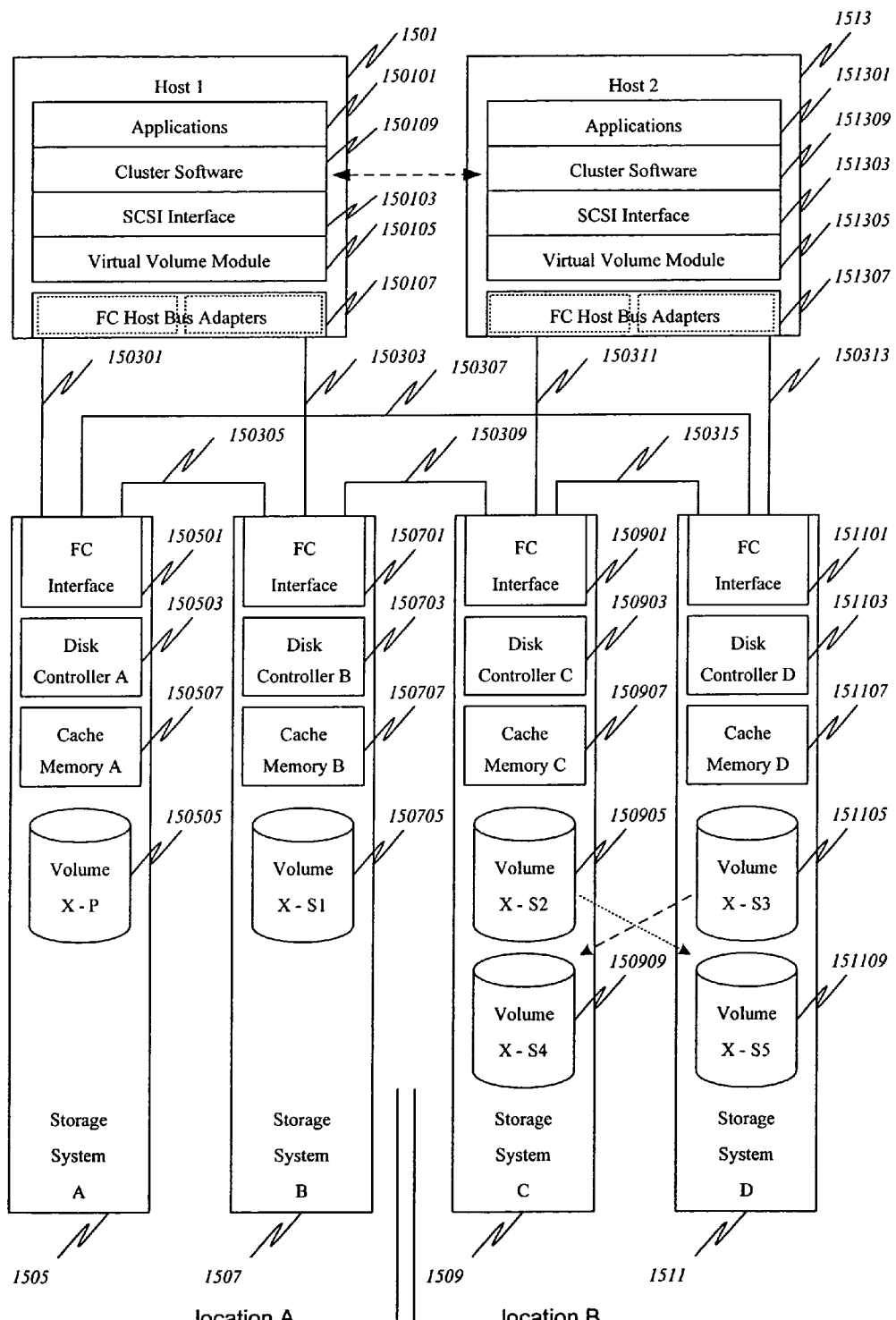
FIG. 5 is a block diagram showing a configuration of a computer system to which a fifth embodiment of the present invention is applied.

Refer now to FIG. 5 for a discussion of an embodiment according to a fifth aspect of the present invention. This aspect of the invention provides for disaster recovery using redundant data replication.

Generally in accordance with this fifth aspect of the present invention, a first host and a second host each is connected to a pair of storage systems. One host is configured for standby operation and becomes active when the other host fails. A virtual volume module is provided in each host. In the active host, the virtual volume module services I/O requests from applications running on the host by accessing one of the storage systems connected to the host. Data replication is performed between the pair of storage systems associated with the host, and between the pairs of storage systems. When the active host fails, the standby host takes over and uses the pair of storage systems associated with the standby host. Since data replication was being performed between the two pairs of storage systems, the standby host has access to the latest data; i.e., the data at the time of failure of the active host. Following is a discussion of an illustrative embodiment of this aspect of the present invention.

Two hosts 1501, 1513 are coupled to storage systems via FC networks. An FC network 150301 connects host 1501 to a storage system 1505 (Storage System A). An FC network 150303 connects the host 1501 to a storage system 1507 (Storage System B). An FC network 150305 connects the storage system 1505 to the storage system 1507. For the host 1513, an FC network 150311 connects the host 1513 to a storage system 1509 (Storage System C). An FC network 150313 connects the host 1513 to a storage system 1511 (Storage System D). An FC network 150315 connects the storage system 1509 to the storage system 1511. An FC network 150307 connects the storage system 1505 to the storage system 1511. An FC network 150309 connects the storage system 1507 to the storage system 1509.

Each storage system 1505, 1507, 1509, 1511 includes one or more FC interfaces 150501, 150701, 150901, 151101, one or more disk controllers 150503, 150703, 150903, 151103, one or more cache memories 150507, 150707, 150907, 151107 and one or more volumes 150505, 150705, 150905, 151105, 150909, 151109.

Storage system 1505 provides a volume designated as Volume X-P 150505 for storing data. Storage systems 1507, 1509, 1511 likewise, provide volumes designated as Volume X-S1 150705, Volume X-S2 150905, Volume X-S3 151105, Volume X-S4 150909, Volume X-S5 151109 for storing data. A volume is a logical unit of storage that is composed of one or more physical disk drive units. The physical disk drive units that constitute the volume can be part of the storage system or can be external storage that is separate from the storage system.

The host 1501 and its associated storage systems 1505, 1507 are located in a data center in a location A. The host 1513 and its associated storage systems 1509, 1511 are located in a data center at a location B. The data centers can be connected in a WAN that includes FC networks 150307, 150309.

Each host 1501, 1513 is configured as described in Embodiment 3. In particular, each host 1501, 15132 includes respective cluster software 150109, 151309. In this embodiment, however, the cluster software is configured for ACTIVE-SLEEP operation (also known as active/passive mode). In this mode of operating a cluster, one host is active (e.g., host 1501), the other host (e.g., host 15013) is in a standby mode. Thus, from the point of view of storage access, there is only one active host. When the standby host detects or otherwise determines that the active host has failed, it then becomes the active host. For example, Veritas Cluster Server by VERITAS Software Corporation provides this mode of cluster operation.

Each host 1501, 1513 is configured as described in Embodiment 3. In particular, each host 1501, 1513 includes respective cluster software 150109; 151309. In this embodiment, however, the cluster software is configured for ACTIVE-SLEEP operation (also known as active/passive mode). In this mode of operating a cluster, one host is active (e.g., host 1501), the other host (e.g., host 1513) is in a standby mode. Thus, from the point of view of storage access, there is only one active host. When the standby host detects or otherwise determines that the active host has failed, it then becomes the active host. For example, Veritas Cluster Server by VERITAS Software Corporation provides this mode of cluster operation.

Under normal operating conditions, applications 150101 executing in the active host 1501 make I/O requests. The virtual volume module 150105 services the request by communicating corresponding I/O operations to Volume X-P 150505, which serves as the production volume. Volume X-P and Volume X-S1 150705 are configured as a remote copy pair via a suitable interaction between the virtual volume module 150105 and the disk controller 150503. Write operations made to Volume X-P are thereby replicated to Volume X-S1 via the FC network 150305 synchronously. Volume X-S1 thus serves as the backup for the production volume. The data transfer is a synchronous operation. The host 1513 is in standby mode and thus the virtual volume module 151305 is inactive as well.

The virtual volume module 150505 configures the volumes for the following data replication and backup operations: Volume X-P and Volume X-S3 151105 are also configured as a remote copy pair. Write operations made to Volume X-P are thereby replicated to Volume X-S3 via the FC network 150307. The data transfer can be synchronous or asynchronous.

Volume X-S1 and Volume X-S2 150905 are configured as a remote copy pair. Write operations made to Volume X-S1 are thereby replicated to Volume X-S2 via the FC network 150309. The data transfer can be synchronous or asynchronous.

Volume X-S2 and Volume X-S5 151109 are configured as a remote copy pair. Write operations made to Volume X-S2 are thereby replicated to Volume X-S5 via the FC network 150315. The data transfer is synchronous.

Volume X-S3 and Volume X-S4 150909 are configured as a remote copy pair. Write operations made to Volume X-S3 are thereby replicated to Volume X-S4 via the FC network 150315. The data transfer is synchronous.

Consider the failover situation in which the storage system 1505 fails. The virtual volume module 150105 will detect this and perform a failover process as discussed in Embodiment 1. Subsequent I/O requests by the applications running on the host 1501 will be serviced by the virtual volume module 150105 by accessing Volume X-S1. Note that data replication continues despite the failure of the storage system 1505 because Volume X-S1 is backed up by Volume X-S2.

Consider the failover situation in which the storage system 1507 fails. Data I/O requests made by the applications running on the host 1501 will continue to be serviced by the virtual volume module 150105 by accessing Volume X-P. Moreover, data replication of Volume X-P continues with Volume X-S3, despite the failure of the storage system 1507.

Consider the failover condition in which the active host 1501 fails. The cluster software 151309 will detect the condition and activate the host 1513. Applications 151301 will execute to take over the functions provided by the failed host 1501. The virtual volume module 151305 in the now-active host 1513 will access either Volume X-S2 in storage system 1509 or Volume X-S3 in storage system 1511 to service I/O requests from the applications. Since it is possible that the storage system 1505 or the storage system 1507 could have failed before their respective remote copy sites (i.e., storage system 1511 and storage system 1509) were fully synchronized, it is necessary to determine which storage system is synchronized. This determination can be made by asking the storage system 1511 and the storage system 1509 the statuses of the volume pairs, X-P to X-S3 and X-S1 to X-S2. If one of the statuses is SYNCING or SYNCED, then the host splits the pair and uses the secondary volume of the pair as the primary volume of the host. If both statuses are SPLIT, the host checks when the pairs were split and selects the secondary volume of the last split pair as the primary volume for the host. To determine when the pairs were split, as one of the possible implementations, the storage system sends an error message to the host when the pair is split and the host records the error.

If it is determined that Volume X-S2 has the latest data, then the virtual volume module 151305 will service I/O requests from the applications 151301 using Volume X-S2. Volume X-S5 will serve as backup by virtue of the volume pair configuration discussed above. If it is determined that Volume X-S3 has the latest data, then the virtual volume module 151305 will service I/O requests from the applications 151301 using Volume X-S3. Volume X-S4 will serve as backup by virtue of the volume pair configuration discussed above.

Failover processing by the standby host 1513 includes the cluster software 151309 instructing the disk controller 150903 to perform a SPLIT operation to split the volume pair Volume X-S1 and Volume X-S2. The virtual volume module also instructs the disk controller 151103 to split the Volume X-P and Volume X-S3 pair.

As noted above, the virtual volume module 151305 knows which volume (Volume X-S2 or Volume X-S3) has the latest data. If Volume X-S2 has the latest data (or both volumes have the latest data, a situation where there was no failure at either of storage system 1505 or storage system 1507), then a script which is installed on the host and is initiated to start by the cluster software 151309 configures the virtual volume module 151305 to use Volume X-S2 as the primary volume and Volume X-S5 as the secondary volume. If, on the other hand, Volume X-S3 has the latest data, then the script configures the virtual volume module to use Volume X-S3 as the primary volume and Volume X-S4 as the secondary volume.

The embodiments described above each have the virtualization module in the host. However, virtualized storage systems also include a virtualization component that can be located external of the host, between the host machine and the storage system. For example, a storage virtualization product like the Cisco MDS 9000 provides a virtualization component (in the form of software) in the switch. In accordance with the present invention, the functions performed by the virtualization component discussed above can be performed in the switch, if the virtualization component is part of the switch. Also the virtualization component can be located in an intelligent storage system. The intelligent storage system stores data not only in local volumes but also in external volumes. The local volumes are volumes which the intelligent storage system has in itself. The external volumes are volumes which external storage systems have and the intelligent storage system can access the external volumes via networking switches. The virtual volume module running on the intelligent storage system performs the functions discussed above. In this case, the primary volumes can be the local volumes and the secondary volumes can be the external volumes.

What is claimed is:

1. A method for accessing physical storage from a host computer comprising:

receiving I/O (input/output) requests from one or more applications in the host computer, the I/O requests being directed to a virtual storage volume;

designating one of two or more storage systems as a target storage system;

maintaining pairing information in the virtual storage volume, the pairing information relating to a pairing state of physical storage volumes which constitute the two or more storage systems;

for each I/O request, producing one or more corresponding I/O operations that are directed to a target physical storage volume, the target physical storage volume being contained in the target system, the target physical storage volume being associated with the virtual storage volume;

communicating the one or more corresponding I/O operations to the target storage system to service the I/O requests; and communicating a request to initiate a data copy process in which data in one of the storage systems, designated as the primary system, is copied to another of the storage systems, designated as the secondary system, wherein the primary system is designated as the target storage system.

2. The method of claim 1 wherein the foregoing steps are performed in the host computer, wherein the host computer includes a communication interface associated with each of the storage systems, wherein the steps of communicating includes communicating via the communication interface that is associated with the target storage system.

3. The method of claim 1 further comprising receiving an indication of an error in the primary system, wherein the data copy process is initiated in response to receiving the indication of the error.

4. The method of claim 3 further comprising detecting a failure in the primary system whereby the primary system cannot service the I/O requests and in response thereto designating the secondary system as the target storage system and designating a volume in the secondary system as the target physical volume, whereby the secondary system services subsequent I/O requests from the host computer.

5. The method of claim 4 further comprising detecting a recovery in the primary system whereby the primary system is capable of servicing the I/O requests, and in response thereto initiating a second data copy process to copy data in the secondary system to the primary system, and subsequent to completion of the second copy process designating the primary system as the target storage system and designating a volume in the primary system as the target physical volume, whereby the primary system services subsequent I/O requests from the host computer.

6. The method of claim 3 wherein the data copy process is a data migration operation, the method further comprising detecting completion of the data migration operation and in response thereto designating the secondary system as the target storage system and designating a volume in the secondary system as the target physical storage volume, whereby the primary system is no longer being used as the target storage system.

7. The method of claim 1 wherein one of the two or more storage systems is designated as a first storage system and another of the two or more storage systems is designated as a second storage system, wherein the first storage system is further designated as the target storage system, the method further comprising:

communicating a first I/O request to initiate first operation wherein data that is written to the first storage system is replicated to the second storage system, wherein if a failure is detected in the first storage system, the second storage system is designated as the target system, the target physical volume being a volume in the second storage system;

communicating a second I/O request to initiate second operation wherein data that is written to the first storage system is replicated to a third of the two or more storage systems, the third storage system thereby providing data backup for the first storage system; and communicating a third I/O request to initiate third operation wherein data that is written to the second storage system is replicated to a fourth of the two or more storage systems, the fourth storage system thereby providing data backup for the second storage system.

8. The method of claim 7 wherein the foregoing steps are performed in the host computer.

9. The method of claim 1 further comprising:

communicating a request to initiate a first data copy process in which data in a first volume in one of the storage systems, designated as the first storage system, is copied to a second volume in another of the storage systems, designated as the second storage system; and communicating a request to initiate a second data copy process in which data in a third volume in the second storage system is copied to a fourth volume in the first storage system, wherein the target storage system is identified based on I/O load conditions in the first and second storage systems, wherein the target physical volume is either the first volume or the third volume.

10. The method of claim 9 wherein the foregoing steps are performed in the host computer.

11. The method of claim 1 wherein the applications include user-level applications and system-level applications.

12. The method of claim 1 wherein the one or more corresponding I/O operations are SCSI commands.

13. The method of claim 1 wherein the step of communicating includes communicating over one or more FC (Fibre Channel) networks.

14. The system of claim 1 wherein the virtual storage volume additionally maintains information relating to availability of the physical storage volumes.

15. The system of claim 1 wherein the pairing state is selected from one of the following: SYNCING, SYNCED, SPLIT, REVERSE-SYNCING, REVERSE-SYNCED, or DECOUPLED.

16. A data access system comprising:

a data processing unit operable to execute computer program instructions, wherein execution of some of the computer program instructions produces I/O operations directed to a virtual volume;

a virtual volume module operable to receive the I/O operations and to produce corresponding I/O operations that are directed to a target physical volume, the virtual volume module maintaining pairing information relating to a pairing state of physical storage volumes which constitute a first and a second storage system;

a first communication interface configured for connection to a communication network; and at least a second communication interface configured for connection to a communication network, wherein the virtual volume module is further operable to selectively communicate the corresponding I/O operations to the first storage system via the first communication interface and to at least the second storage system via the second communication interface, wherein the first and second storage systems each are connected to a communication network, wherein the virtual volume module is further operable to communicate a request to initiate a data copy process in which data in the first storage system is copied to the second storage system, wherein the corresponding I/O operations are communicated to the first storage system, the target physical volume being a volume in the first storage system, wherein the target physical volume is contained in either the first storage system or the second storage system.

17. The system of claim 16 wherein the virtual volume module is operable to receive an error indication from the first storage system and to initiate the data copy process in response thereto.

18. The system of claim 17 wherein the virtual volume module is further operable to detect a failure in the first storage system and in response thereto to subsequently communicate corresponding I/O operations to the second storage system, the target physical volume being a volume in the second storage system.

19. The system of claim 17 wherein the data copy process is a data migration operation, wherein the virtual volume module is further operable to detect completion of the data migration operation and in response thereto to communicate corresponding I/O operations to the second storage system, the target physical volume being a volume in the second storage system.

20. The system of claim 16 wherein the virtual volume module is further operable to:

initiate an operation wherein data that is written to the first storage system is replicated to the second storage system, wherein if a failure is detected in the first storage system, then corresponding I/O operations are communicated to the second storage system, the target physical volume being a volume in the second storage system;

initiate an operation wherein data that is written to the first storage system is replicated to a third storage system, the third storage system thereby providing data backup for the first storage system; and initiate an operation wherein data that is written to the second storage system is replicated to a fourth storage system, the fourth storage system thereby providing data backup for the second storage system.

21. The system of claim 16 wherein the virtual volume module is further operable to:

communicate a request to initiate a first data copy process in which data in a first volume in the first storage system is copied to a second volume in the second storage system; and communicate a request to initiate a second data copy process in which data in a third volume in the second storage system is copied to a fourth volume in the first storage system, wherein selection of either the first storage system or the second storage system is based on I/O load conditions in the first and second storage systems, wherein the target physical volume is either the first volume or the third volume.

22. The data access system of claim 16 wherein the virtual volume module maintains information relating to availability of the plurality of physical volumes within the first and second storage systems.

23. A data access method comprising:
  receiving I/O (input/output) requests from one or more applications in the host computer, the I/O requests being directed to a virtual storage volume;
  designating one of two or more storage systems as a target storage system;
  maintaining pairing information in the virtual storage volume, the pairing information relating to a pairing state of physical storage volumes which constitute the two or more storage systems;
  for each I/O request, producing one or more corresponding I/O operations that are directed to a target physical storage volume, including designating either a first storage system or a second storage system as a target storage system, the target storage system containing the target physical volume, the target physical storage volume being associated with the virtual storage volume;
  communicating the one or more corresponding I/O operations to the target storage system;
  communicating a first action to initiate an operation wherein data that is written to the first storage system is replicated to the second storage system, wherein if a failure is detected in the first storage system, the second storage system is designated as the target system, the target physical volume being a volume in the second storage system;
  communicating a second action to initiate an operation wherein data that is written to the first storage system is replicated to a third storage system, the third storage system thereby providing data backup for the first storage system; and
  communicating a third action to initiate an operation wherein data that is written to the second storage system is replicated to a fourth storage system, the fourth storage system thereby providing data backup for the second storage system.

24. The method of claim 23 wherein the foregoing steps are performed in the host computer, wherein the host computer includes a communication interface associated with each of the storage systems, wherein the steps of communicating includes communicating via the communication interface that is associated with the target storage system.

25. The data access method of claim 23 further comprising maintaining information relating to availability of the one or more physical storage volumes in the virtual storage volume.

26. A data storage system comprising:
  at least one host computer system configured to execute one or more applications, the applications making I/O requests, the I/O requests being directed to a virtual storage volume, the host computer system comprising:
  a virtual volume module operable to produce corresponding I/O operations to service the I/O requests, the I/O operations being directed to a target physical volume;
  a first communication interface for connection to a communication network; and
  a second communication interface for connection to communication network;
  a first storage system in data communication with the host computer system via the first communication interface;
  a second storage system in data communication with the host computer system via the second communication interface;
  a third storage system in data communication with the first storage system; and
  a fourth storage system in data communication with the second storage system,
  the first storage system operating in a mode wherein data that is written to the first storage system is replicated to the second storage system,
  wherein the virtual volume module is further operable to designate the first storage system as a target storage system, the target physical volume being a volume in the first storage system,
  wherein if a failure is detected in the first storage system, the second storage system is designated as the target system, the target physical volume being a volume in the second storage system,
  the first storage system further operating in a mode wherein data that is written to the first storage system is replicated to the third storage system, the third storage system thereby providing data backup for the first storage system,
  the second storage system further operating in a mode wherein data that is written to the second storage system is replicated to the fourth storage system, the fourth storage system thereby providing data backup for the second storage system.

27. A method for accessing storage from a first host system and a second host system, the first and second host systems each having first and second communication interfaces for communication respectively with first and second storage systems, the first and second communication interfaces each being configured for connection to a communication network, the method comprising:
  in each of the first and second host systems, executing one or more applications which make I/O requests, the I/O requests being directed to a virtual volume;
  in each of the first and second host systems, maintaining pairing information in the virtual volume, the pairing information relating to a pairing state of physical storage volumes which constitute the first and second storage systems;
  in each of the first and second host systems, executing clustering software to monitor the operational state of the other host system, wherein if one of host systems fails, the other host system can service users of the failed host system;
  in each of the first and second host systems, producing corresponding I/O operations that are directed to a target physical volume in order to service the I/O requests;
  in each of the first and second host systems, designating the first storage system as a target storage system, the target physical volume being a volume in the first storage system; and
  in each of the first and second host systems, if a failure in the first storage system is detected, then designating the second storage system as the target storage system, the target physical volume subsequently being a volume in the second storage system.

28. A method for accessing storage from a first host system and a second host system, the first host system having first and second communication interfaces for communication respectively with first and second storage systems, the second host system having first and second communication interfaces for communication respectively with third and fourth storage systems, the first and second communication interfaces of each host system each being configured for connection to a communication network, the method comprising:

performing a first data replication operation in which data written to the first storage system is copied to the second storage system;

performing a second data replication operation in which data written to the first storage system is copied to the fourth storage system;

performing a third data replication operation in which data written to the second storage system is copied to the third storage system;

performing a fourth data replication operation in which data written to the third storage system is copied to the fourth storage system;

in each of the first and second host systems, executing clustering software to monitor the operational state of the other host system, wherein the first host system is active and the second host system is in standby mode;

in the first host system:

executing one or more applications which make I/O requests, the I/O requests being directed to a virtual volume;

producing corresponding I/O operations that are directed to a target physical volume in order to service the I/O requests;

designating the first storage system as a target storage system, the target physical volume being a volume in the first storage system; and if a failure in the first storage system is detected, then designating the second storage system as the target storage system, the target physical volume subsequently being a volume in the second storage system; and in the second host system detecting a failure in the first host system and in response thereto performing a failover operation whereby the second host system becomes active and performs steps of:

executing one or more applications which make I/O requests, the I/O requests being directed to a virtual volume;

producing corresponding I/O operations that are directed to a target physical volume in order to service the I/O requests;

designating the third storage system as a target storage system, the target physical volume being a volume in the third storage system; and if a failure in the third storage system is detected, then designating the fourth storage system as the target storage system, the target physical volume subsequently being a volume in the fourth storage system.

* * * * *